(12) United States Patent
Billiotte et al.

(10) Patent No.: US 7,542,881 B1
(45) Date of Patent: Jun. 2, 2009

(54) CENTRALISED STOCHASTIC SIMULATION METHOD

(76) Inventors: Jean-Marie Billiotte, 18, boulevard Maillot, 92200 Neuilly sur Seine (FR); Ingmar Alderberg, 44 Rue de Montmorency, 75003 Paris (FR); Raphael Douady, 2 rue d'Uhn, 75005 Paris (FR); Olivier Le Marois, 102 rue de la Tour, 75016 Paris (FR); Philippe Durand, 19 Avenue de Villiers, 75017 Paris (FR); Frédéric Basset, 29 Ennismore Gardens, London (GB)

( * ) Notice: Subject to any disclaimer, the term of this patent is extended or adjusted under 35 U.S.C. 154(b) by 364 days.

(21) Appl. No.: 10/168,013

(22) PCT Filed: Jul. 17, 2000

(86) PCT No.: PCT/FR00/02055

§ 371 (c)(1),
(2), (4) Date: Jan. 28, 2003

(87) PCT Pub. No.: WO01/86473

PCT Pub. Date: Nov. 15, 2001

(30) Foreign Application Priority Data

May 11, 2000 (FR) .................................. 00 06113

(51) Int. Cl.
*G06F 17/10* (2006.01)
(52) U.S. Cl. ........................................ 703/2; 705/36 R
(58) Field of Classification Search ............... 703/2; 705/36 R
See application file for complete search history.

(56) References Cited

U.S. PATENT DOCUMENTS

| | | | | | |
|---|---|---|---|---|---|
| 5,826,065 | A | * | 10/1998 | Hinsberg et al. | 717/104 |
| 6,061,662 | A | * | 5/2000 | Makivic | 705/36 R |
| 6,085,175 | A | * | 7/2000 | Gugel et al. | 705/36 R |
| 6,125,355 | A | * | 9/2000 | Bekaert et al. | 705/36 R |

OTHER PUBLICATIONS

Kuo-chu Chang et al; "Joint Probabilistic Data Association in Distributed Sensor Networks", Oct. 1986, IEEE Transaction on Automatic Control. vol. AC-31, pp. 889-897.*

Eliezer Oron et al; "Precision Tracking with Segmentation for Imaging Sensors", Jul. 1993, IEEE Transactions on Aerospace and Electronic Systems, vol. 29, No. 3, pp. 977-987.*

John C. Hull, "Options, Futures, and Other Derivatives", third edition, 1997, Prentice-Hall, pp. 144-145, 209-220, 331-332, 361-364.*

(Continued)

*Primary Examiner*—Paul L Rodriguez
*Assistant Examiner*—Russ Guill
(74) *Attorney, Agent, or Firm*—Foley & Lardner LLP

(57) ABSTRACT

A method of simulating a local system which is in interaction with other local systems within a global environment. The method includes generating, at a central location, a collection of global sets of values, each representing a possible future global state of the global environment at a future time, and the collection representing a variety of possible future global states. The method also includes transmitting the collection of global sets of values to the local systems. The local systems receive some of the collection, select a local set of parameters, and perform calculations on that data. The collection of values is used as a predictive simulation of the local system.

43 Claims, 9 Drawing Sheets

OTHER PUBLICATIONS

Figure 1:
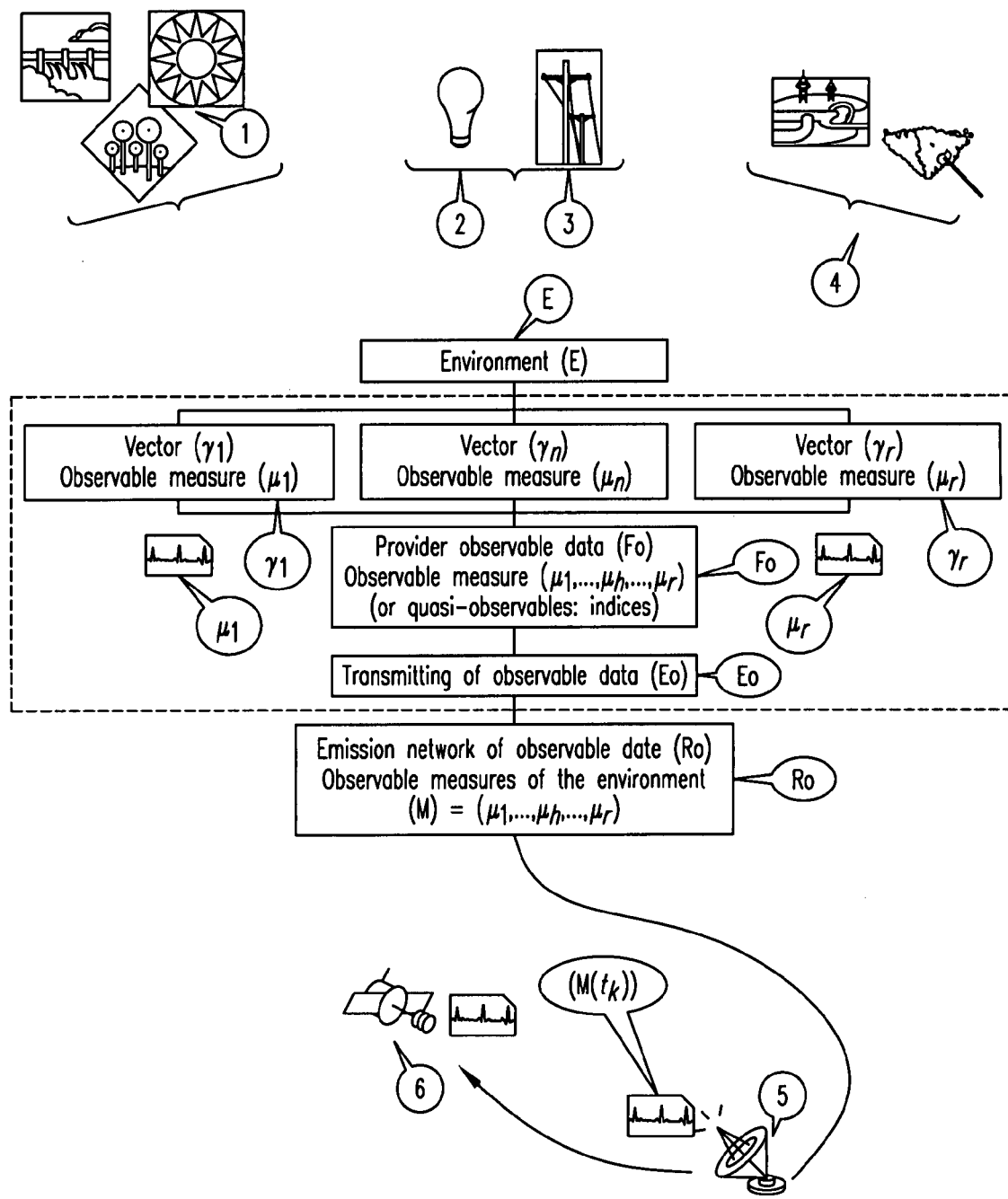

Frank Duserick et al., "Financial simulation using distributed computing technology", 1999, Developments in Business Simulation and Experiential Exercises, vol. 26, pp. 52-57.*

Richard M. Fujimoto, "Parallel and distributed simulation", 1999, Proceedings of the 1999 Winter Simulation Conference, pp. 122-131.*

Rhonda Righter et al., "Distributed simulation of discrete event systems", 1989, Proceedings of the IEEE, vol. 77, No. 1, pp. 99-113.*

John M. Mulvey and Hercules Vladimirou, "Stochastic network programming for financial planning problems", Nov. 1992, Management Science, vol. 38, No. 11, pp. 1642-1664.*

Michael C. Fu, "Pricing of financial derivatives via simulation", 1995, Proceedings of the 1995 Winter Simulation Conference, pp. 126-132.*

L.F. Escudero et al., "A parallel computation approach for solving multistage stochastic network problems", 1999, Annals of Operations Research, vol. 90, pp. 131-160.*

Fred Stambaugh, "Risk and Value at Risk", 1996, European Management Journal, vol. 14, No. 6, pp. 612-621.*

Crouhy et al., "Risk Management" McGraw Hill 2001, ISBN 0-07-135731-9, pp. 187-249.

Dowd, K., "Beyond Value at Risk" Wiley & Sons 1998, ISBN 0-471-97621-0, pp. 63-69, 99-115.

Fabozzi, F., "Investment Management, 2nd Ed" Prentice Hall 1999, ISBN 0-13-889155-9, p. 69.

Hull et al., "Options, Futures and Other Derivatives, 4th Ed." Printice Hall 1999, ISBN 0-13-014819-9, Ch. 11.

Guill, G., "Bankers Trust and the Birth of Modern Risk Management" The Wharton School, circa 1999, Financial Institutions Center, pp. 1-23.

Zumbach, G., "A gentle introduction to the RM 2006 methodology" Aug. 2006, pp. 1-13., RiskMetrics Group, New York, NY.

http://www.bloomberg.com/markets/index.html?intro%20markets Nov. 26, 2007.

http://today.reutres.com/investing/MarketsHome.aspx Nov. 26, 2007.

http://ids.csom.umn.edu/faculty/kauffman/course/8420/Project/Risk_Mgmt/index2.htm Nov. 26, 2007.

* cited by examiner

CENTRALISED STOCHASTIC SIMULATION METHOD

TECHNICAL FIELD

The invention relates to the technical field of "Industrial Risk Management" and more specifically to:

Statistic/probabilistic prediction processes of the probability law on statistic distribution of variations that indicate future behaviour and optimisation of productivity parameters for a number of remote local industrial systems subjected to a common global environment, both random and evolutionary in nature.

Simulation processes, i.e. which use a predetermined sampling of probable future scenarios of environment state variables.

The invention relates specifically to the following cases:

Where a vast number of decentralised industrial sites have an unpredictable behaviour given that they are subjected to a common global environment, both random and evolutionary in nature (which we may, in the majority of cases, characterise as a risk environment).

Where this random and evolutionary environment is currently quantifiable, i.e. that it may be, overall, described numerically through state variables common to all industrial sites (as defined below).

These state variables are actually:

Either, common to all industrial sites.

Or, when they appear specific to an industrial site, "quasi common" given that their behaviour is governed by complex relations with other state variables of the model (not specific to said site), in such a way that their probability law may not be analysed independently from that of other state variables common or specific to other sites.

Subsequently, and notably in the description and the claims that follow, the term "common state variables" shall be referred to (by extension) as all state variables of either one of the two types described above. Subsequently, the terms random environment and risk environment shall also be used interchangeably.

According to the invention, an industrial site is understood to be any location with human activity where the object is the production of added value (production flow), that is expressed directly or indirectly in terms of added value, whether it be within the manufacturing, energy, food processing, finance, transport, public health, use of raw materials industries amongst others.

Subsequently, as an application example for the invention and an analysis of the previous work, we shall frequently refer to the financial industry. It is within this field that the application of probabilistic prediction processes for random behaviour is more commonly used given that it is governed by regulation constraints ("CAD" directives of the Council of European Communities, "Basle Committee" recommendations, "Group of 30" recommendations). However, lessons taken from this invention may be applied within nearly every industrial field. By using the financial field as an example, we understand quantifiable risk (random environment) to be market, credit, counterparty, liquidity risks amongst others. In contracts, non-quantifiable risks may be legal, fraud or media related risks.

The invention relates specifically to the following cases:

Where the behaviour of environment state variables is unpredictable or uncontrollable, in such a way that these constitute random "risk factors" that may cause a variation and in particular, decreased effectiveness (or a risk on the behaviour of each) of decentralised industrial sites possibly reflected in losses (money, human life, production and so forth).

Where the effectiveness of each local system may also be described through a numerical productivity indicator according to a local numerical systems analysis model (generally of the type with parameters) that has been previously determined, dependent upon each system and at each instant of all or some state variables and local action parameters which allow the functioning level of the local industrial system to be adjusted.

The invention relates to the industrial fields, that are manufacturing and financial, either public or private, where it is suitable:

To statistically estimate, and thus mark out at each industrial site a random numerical productivity indicator of a manufacturing industrial type (production, pollution) or financial (profit/loss) or other, and involved in an added value production exercise (manufacturing, agricultural or financial production and so forth).

To optimise the numerical productivity (or risk) indicator of each industrial site by adjusting local action parameters of that industrial site.

For the above by, in particular, taking regulation criteria into account that would set limits to this productivity (or risk) indicator.

DESCRIPTION OF PREVIOUS WORK

The second half of the twentieth century became aware of the pernicious risk effects and, as a result, of its cost and the birth of a new science, namely "Risk Management". "Risk Management" is a science that:

Studies quantifiable or non-quantifiable factors that threaten the productivity or behaviour of an industrial or private system.

Provides strategic (organisational and process) solutions and tactics (quantitative management methods, for example) in order to combat these factors.

The previous work is concerned with "Risk Management" methods for industrial systems. Thus, U.S. Pat. No. 6,021,402 outlines a risk management method for a network of industrial systems concerned with electric production. U.S. Pat. No. 5,930,762 outlines a risk management system for a device whose behaviour is bound by multiple environment parameters.

The previous work is concerned with five different analysis and/or decision-making methods that relate to risk of random systems:

Decision tree processes.

Statistic/probabilistic processes (for e.g., variance-convariance, historic, Monte-Carlo).

Variational methods (for e.g., "base point value" (PV01)).

Extreme scenario methods (for e.g., "Stress Testing", "Catastrophe Scenario").

Artificial intelligence methods.

a) Decision tree processes are used in sequential decision-making processes. A diagram that resembles the branches of a tree depicts all possible events and the sequence of decision choices that are the result of previous decisions. This decision tree method may be only used in very simple cases where anticipated events and the probability of each event are already known. Numerical calculations available with this method are simple and may be implemented without a calculator. However, the method is not sufficient enough to outline the risk structure of complex random systems.

b) In many cases, anticipated events are governed by different state variables whose exact value can not be known. This type of problem is normally analysed through a statistic/probabilistic process. Subsequently, we shall outline the "statistic/probabilistic process" to estimate the future behaviour of a system subjected to a random environment that may be descried through state variables. It is a method that provides a statistic estimate of the probability law in the distribution of variations for a numerical productivity indicator of that system. The latter is achieved with the help of a probability distribution model together with environment state variables (risk factors), all of which is previously determined. This is in contrast with the decision tree process (or any other type of risk analysis) where results are unique values.

c) Variational methods quantify the behaviour outcome of a system where there is variation of one or several environment parameters (state variables). Thus in the financial field, the method known as "base point value" (PV01) quantifies the sensitivity of a securities portfolio with a 0.01% gap (one "base point") through a parallel and uniform move of the interest rate curve be it upwards or downwards. In this case, it will be noted that the probability of occurrence and the range of variation are not known. This is insufficient to describe the reality of risk behaviour for a complex random system.

d) The aim of extreme scenario methods is to estimate the result of particular scenarios occurring on a system. Thus, in the financial field, the "stress testing" method enables interest rates to be adjusted at various points along the curve so, for example, to simultaneously increase an expiration date and decrease another. This method is used in order to simulate what could happen following a catastrophe scenario (to predict what would only happen very rarely). In this case, it will be noted that time and probability factors are not implicated. This is also insufficient to describe the reality of risk behaviour for a complex random system.

e) In different cases where we would want to predict random changes such as variations in petrol or share prices rather than predict a risk, too many factors come into play that are themselves too unpredictable and difficult to model with mathematical tools. In order to broach these prediction issues, methods known as "artificial intelligence" with "neuron networks" and "expert systems" are used. These artificial intelligence techniques are capable of reasoning with a vague or incomplete information base. This technology was recently used for geological production prediction and market predictions. However, these methods are unsuitable for general risk analysis of industrial systems in view of common, especially regulation, criteria. Thus, U.S. Pat. No. 5,521, 813 outlines a prediction system of climatic variation consequences on a productive system by using a multiple regression method with neuron network.

The present invention relates specifically to the technological field of statistic/probabilistic processes that aim to provide a statistic estimate of the probability law in the distribution of variations for a numerical productivity indicator of that system. The latter is achieved with the help of a probability distribution model together with environment state variables. The more common field of the previous work in which statistic/probabilistic risk analysis processes are used in that of finance, and more notably market risks. Within the global financial world, market risk is one that the investor faces due to his lack of knowledge concerning future evolution of common state variables that are market basics, such as share prices, interest rates, currency rates and so on. These market variables, also known as risk factors, determine prices of shares, quota assets and portfolios amongst others.

Risks associated with different financial products may be assessed through certain characteristic numbers, such as time and convexity of investment bonds, beta and expected performance of shares, time value, volatility, delta, gamma, theta, vega (derived in relation to volatility) and so on for bonds. However, these different risk approaches known as "sensitive":

Are specific to a financial product type.
Rely on specific distribution hypotheses.
Are not easy to interpret.
Often underestimate the global loss risk on a portfolio which is actually of interest to the investor.
Do not assess the probability level of risk occurrence.
Do not consider temporal forecast.

It is preferable to have a unified probabilistic and temporal approach to risk. Thus, the previous work used the method known as "Value at Risk" (VaR) as risk indicator for a financial system subjected to a random market environment. For a financial asset (or portfolio), the VaR is an amount such that the loss incurred on that asset (or portfolio) during a certain time interval does not but exceed the VaR with a given (weak) probability level. Calculation of VaR requires knowledge of the probability law for the loss incurred (numerical productivity indicator). The basic problem with risk analysis statistic/probabilistic processes (and especially VaR calculation processes) is therefore to predict distribution of the probability law and distribution of variations for a numerical productivity indicator (loss in the case of VaR).

The statistic/probabilistic processes that aim to provide a statistic estimate of the probability law in the distribution of variations for a numerical productivity indicator of a system are mainly of two types:

Those, which we shall subsequently call "simulation":
That use a generation process of a vast number of statistical sampling with a multi-varied description (of n-uplets) probable values linked to state variables (risk parameters).
That lead to a "point by point histogram" of the probability law structure in the statistic distribution of variations for a numerical productivity indicator of the system (i.e. in its entirety).
That enable the VaR to be calculated generally, with no previous hypothesis on the probability law in this statistic distribution of variations for a numerical productivity indicator.

As opposed to those, which we shall subsequently call "analytical" (and which we could also characterise as parametric, normative or synthetic):
That provide only a few descriptive parameters (in a set number) of the probability law in the statistic distribution of variations for a numerical productivity indicator of the system.
That impose a particular form to the assessment model of the system's numerical productivity indicator according to state variables (risk parameters), (especially a hypothesis of linearity, a quadratic condition and so on).
That lead to restrictive hypotheses for specific parameter descriptions of the probability law in the statistic distribution of variations for a numerical productivity indicator.

Thus, the previous work is concerned with four classical VaR estimate methods (and more generally of statistic estimate of the probability law in the statistic distribution of variations for a numerical productivity indicator of a system subjected to a random environment):

Two analytical statistic/probabilistic methods:
"Delta normal" technique or "estimated variance-convariance matrix" technique that supposes linear productivity.
"Delta gamma" technique that takes a quadratic term into account to calculate system productivity.
And two simulation statistic/probabilistic methods:
Monte-Carlo simulation method.
Historical analysis technique.

The invention relates solely to the technical fields of "simulation statistic/probabilistic" processes.

In order to calculate the VaR of a financial portfolio, the following entries are classically used:

Mathematical models to assess prices of different assets, for e.g.:
The linear combination price model of price variation on an asset according to risk factor variations (such as the "Sharpe Simple Index Model" for shares, which proposes that share price variation is a first degree function of general market index variation).
The non-linear price models, such as the "Taylor Development Model" that is independent of the time factor.
The price models that are a function of time, especially the random stationary model, such as the "Black & Sholes Model" to evaluate options.
Historical models, i.e. observing prices of different assets over a certain amount of time periods in the past.

The "delta normal" (or linear) method, said of the estimated variance-convariance matrix, was suggested and developed by JP Morgan through its RiskMetrix™ system. It consists of three stages as follows:

The report of elementary risk factors within which portfolio financial assets may be broken down.
The distribution of financial flows linked to these aggregated and changing elementary risk factors that correspond to standard expiration dates.
Effective calculation of VaR.

This method provides the following specific theoretical hypotheses by way of example:

Risk factors of each asset obey a normal law.
Asset performance has a linear dependence upon risk factors.
As a result, overall portfolio performance has a linear dependence upon risk factors.

VaR is calculated using the M matrix known as "variance-convariance", of n×n dimension in the case of n risk factors and consisting of n×(n+1)/2 variances-convariance of risk factor variations calculated on the basis of a past historical period. In that $(\lambda=\lambda_i^{i=1\cdots n})$ represents portfolio sensitivities over different risk factors $(X=X_i^{(i=1\cdots n)})$, VaR is calculated using the following formula:

$$VaR = z\sqrt{\lambda M \lambda} + \lambda X$$

where z is the quantile of the reduced normal distribution for the confidence interval value of the retained VaR. In such a way that, according to the variance-convariance matrix method, the risk structure is calculated in an environment of n risk factors by generating n' set parameters of the variance-convariance matrix that describe variances and convariances of risk factor variations. In this sense, the variance-convariance matrix method is an analytical statistic/probabilistic method. The hypothesis of retained linearity meeds strict hypotheses on portfolio sensitivities to be implemented in that it would not be applicable to portfolios with "gamma" or "convexity" risks.

The "delta gamma" method is a more elaborate form of the variance-convariance matrix method. The linearity hypothesis is replaced with a quadratic hypothesis. The method incorporates a second set of sensitivity factors for analysts and requires that application of sophisticated mathematical calculations. Despite its superior position over the "delta normal" methods, the "delta gamma" method is generally unsuitable, especially to assess portfolio risk that includes options reaching maturity or exotic derivative products such as "knock-out" options.

On the contrary, according to the Monte-Carlo simulation method advocated especially by Bankers Trust with its RaRoc 2020™ system:

A choice is made from a family of assessment models for different risk factors or portfolio assets taken from historical observations.
From said assets and risk factors, the following estimates are made:
Distribution of different risk factors and associated parameters namely averages and variance-convariance matrix amongst others.
Relation between asset prices and risk factors.
For all different risk factors and on the basis of retained probabilistic models and determined distribution parameters, a large number (a few hundred to a few thousand) of pseudo-random sampling are extracted with a pseudo-random generator from an estimated distribution of probable future variations of risk factors.
Sampling values for each simulation in the asset behaviour relation are introduced according to common risk factors.
A corresponding portfolio value is recreated for each simulation sample.
A global histogram of the probability law in the statistic distribution of variations for the portfolio value is created without a related previous hypothesis.

In this sense, the Monte-Carlo simulation method is a simulation statistic/probabilistic method.

The historical analysis method advocated especially by Chase Manhattan with the Charisma™ and Risk$™ systems is a simplification of the Monte-Carlo method. According to this historical analysis method, a vast sampling number of probable future variations of risk factors are directly transmitted from the market history. By way of example, the historical VaR of one portfolio day may be estimated from one hundred scenario samples in the following manner:

Recreated values of risk factors are collected from the market history over the last hundred quotation days.
A variation percentage for every day is determined for each risk factor. This allows one hundred multi-valued samplings of probable values for each risk factor to be simulated.
Sampling values corresponding to each historical observation are introduced into the asset behaviour relation according to common risk factors.
A corresponding portfolio value is recreated for each historical sample.
A global histogram of the probability law in the statistic distribution of variations for the portfolio value is created without a related predetermined hypothesis.

In this sense, the historical analysis method is also a simulation statistic/probabilistic method.

The principle behind risk analysis and the use of a "simulation statistic/probabilistic" method is familiar to the previous work and applied to other fields, both financial and industrial. The present invention, which (in combination) entails the use of this method, does not in any way claim responsibility for this method when considered independently. Patent FR2769703 may be referred to, and outlines a process to determine unpredictable analysis of a device using coordinates according to the Monte-Carlo Method. Patent EP0837408 outlines a pulverisation simulation process using the Monte-Carlo Method. Patent WO9905685 outlines an automatic system for industrial surveillance using the Monte-Carlo Method. Patent WO9859322 outlines a system that generates pixel values of an image using the Monte-Carlo Method. Patent WO9852132 outlines a system for allocating organisational resources and assessing resource costs and prices using the Monte-Carlo Method. Patent WO9850835 outlines a monitoring system that can be programmed to supervise industrial equipment activity using the Monte-Carlo Method. Patent WO9836364 outlines an integral assessment process using the Monte-Carlo Method. U.S. Pat. No. 5,940,810 outlines a technique to estimate complex financial asset value using the Monte-Carlo Method.

The statistic/probabilistic methods that provide an estimate of the probability law in the statistic distribution of variations for a numerical productivity indicator of a system subjected to a random environment (and especially VaR estimate methods) can be divided into two distinct groups:

Analytical methods, according to which a small set number of descriptive parameters on the statistic behaviour of risk parameters, are generated. These lead to a parameter description of the probability law in the statistic distribution of variations for a numerical productivity indicator of a system. (This is notably the case of the variance-convariance matrix method in "delta normal" and "delta gamma" RiskMetrics™ techniques).

Simulation methods that use a process of "selective sampling of probable scenarios of environment variables" and according to which a vast number (number may be chosen) of repeated samplings of probable future values and plausible environment variables are generated. These lead to an absolute global histogram description of the probability law in the statistic distribution of variations for a numerical productivity indicator of a system. (This is notably the case of the Monte-Carlo and historical analysis methods).

The invention relates solely to behaviour analysis processes, notably of a "simulation statistic/probabilistic" type that carries out a "selective sampling (selection) of probable scenarios with a multi-value of environment variables".

The previous work knows how to implement a "simulation statistic/probabilistic" method on a unique site and to notably perform all data acquisitions, statistical calculations and so on in order to determine the probability law in the statistic distribution of variations for a numerical productivity indicator of a system when subjected to a random environment. The previous work also knows how to calculate the VaR of a single financial institution's portfolio by using the "simulation statistic/probabilistic" method.

It is further acknowledged that the previous work is able to repetitively transmit numerical values from a centralised site to a vast number of remote sites. This is especially the case of financial data screens used by Reuters and Bloomberg. A central site is connected to sources of variable and random environment data (share prices, financial assets and so on). This concentrated data is transmitted repetitively in a decentralised way towards a vast number of remote sites (screens of financial operators). However, it will be noted that according to the previous work, the transmitted data is real observable or quasi-observable data (share values), i.e. recreated through calculation (index values, internal productivity rates, and so on), and is to be used as such. The previous work is unaware of the principle of systematic and repetitive remote transmission of probable samplings with a multi-value of possible future values of environment variables with the aim of recreating a histogram.

The methods of the previous work as outlined above do not allow a satisfactory probabilistic prediction of future behaviour and/or the optimisation of productivity parameters for a number of remote local industrial systems subjected to a common global environment to be performed. In particular, they do not allow good VaR conditions of a number of financial sites managing share portfolios to be simultaneously calculated. Thus:

On the one hand, as has been described above, only statistic/probabilistic processes that aim to provide a statistic estimate of the probability law in the statistic distribution of variations for a numerical behaviour indicator deliver accurate and reliable risk assessment.

On the other hand, amongst the statistic/probabilistic processes:

A) The analytical method, and in particular, the estimated variance-convariance matrix method, is simple and requires few calculations. It may further be used jointly with various remote sites. Thus, according to a variant used in the previous work, the RiskMetrics™ system provides, from a centralised site via Internet towards a number of remote sites that use its method, a repetitive transmission of a set number of parameters of the variance-convariance matrix. In such as way that the overall VaR calculation is prioritised between the central and remote sites. However, transmitted values are not probable multi-value samplings of environment variables but simple parameters (see above). The drawback to this method is that is requires very strict base hypotheses (conditional normality, linearity, stationariness) that are not acceptable, in the most part, for financial instruments. Thus, VaR calculation according to the variance-convariance matrix method produces errors in the case of portfolios with "gamma" or "convexity" (namely inversions of convexity or discontinuities) instruments, such as options, structured accounts, "mortgage-backed securities" and so on. Overall, analytical VaR including those that have been perfected, summarise the behaviour of a risk structure with the transmission of a limited number of "Greek" parameters (delta, gamma, vega, theta and so on). In general, this is insufficient to describe environments with complex risk factors.

B) The classical simulation method, and in particular, the Monte-Carlo simulation method, is considered by the majority of specialists to be the "purest", the most global and forward-looking in its conception. It is undoubtedly the most theoretically correct and precise and may be used for all financial instruments. Nevertheless, it requires complex choices of assessment models and stochastic processes that generate correctly chosen random samplings. This is very complex given the difficulty in assessing certain instruments and their constant development. It calls upon a large number of specialist teams in order to be correctly implemented on site. Further, it needs a significant number of pseudo-random sample selections to be generated in order to be precise. The availability of large information systems is therefore necessary and expensive. In brief, according to the Monte-Carlo Method in the previous work, each site must have an expensive information system and a broad and experienced term for it to be implemented. In such a way that it is not widely acceptable to the majority of financial institutions or industrial sites that would wish for and be interested in its implementation in order to reduce their risk.

C) The major inconvenient of the historical analysis by simulation method is its extreme sensitivity to data quality. Actually, one or several unusual observations (be they truly exceptional or containing a mistake at the outset) strongly influence the VaR value over an extended period (equal to the length of historical periods). It is said that the theory of extreme values could overcome this inconvenience. Unfortunately, the amount of calculations involved in its use is prohibitive. Further, the historical VaR are inaccurate and must be completed using appropriate "stress tests". Consequently, and according to the historical method of the previous work, each site must be equipped with a costly information system and a large team to implement it. In such as way that it may also not be accessible to the majority of financial institutions or industrial sites that would wish for or have an interest in its implementation in order to reduce their risk.

It is acknowledged that the previous work is capable of transmitting the most probable scenario of environment variables towards remote sites (for e.g, televisions). This is especially the case for predictions of meteorological variables (such as winds, temperatures and so on) at various points. However, this does not allow for a global probabilistic view (probability law in the statistic distribution of variations for a numerical behaviour indicator) and is limited to a small number of parameters for each site.

Further, risk management procedures require uniform risk analysis and therefore a unified method in their assessment.

In such a way that the analysis of the previous work emphasises the need for a probabilistic prediction technique of future behaviour (and/or optimisation of productivity parameters) of a vast number of remote local industrial systems (in particular a number of financial sites) subjected to a common global environment. The system should provide an accurate and reliable risk assessment of a "simulation statistic/probabilistic" type, i.e. working with a selective sampling of probable scenarios of environment variables by using a minimum of:

Human resources.
Means of information calculation.

SUMMARY OF THE INVENTION

According to the invention, the aim of the "statistic/probabilistic" process by stochastic simulation is to perform in a prioritised way, yet jointly (i.e. simultaneously), the probabilistic prediction of future behaviour and/or the optimisation of productivity parameters of a vast number of remote local industrial systems ($S_u^{(u=1\ldots n)}$). It is applied to the following cases:

Where these local industrial systems ($S_u$) are a great distance from one another but are subjected to common and evolutionary global environment (E) that may be numerically described with p state variables ($X_i(t)^{(i=1\ldots p)}$), which are effectively the components of a state vector ($X(t)=X_i(t)^{(i=1\ldots p)}$).

Where p state variables ($X_i(t)^{(i=1\ldots p)}$) are common to the vast number of n (where n is much greater than >> 1) remote local decentralised industrial systems ($S_u^{(u=1\ldots n)}$).

Where the effectiveness of each local system ($S_u^{(u=1\ldots n)}$) may be further described with a numerical productivity indicator ($I_u^{(u=1\ldots n)}$) according to a local numerical systems analysis model with parameters ($D_u$) that has been previously set ($I_u=D_u^{(u=1\ldots n)}(\lambda u, X(t))$) for each system ($S_u$) and for each instant (t) and is dependent upon:

All or some ($X_i(t)^{(i=1\ldots p)}$) state variables of the state vector ($X(t)$).

A vector of local q action parameters (that may be adjusted) ($\lambda_u=(\lambda_{u1},\ldots,\lambda_{uq})$).

According to the invention, the stochastic simulation process follows a classical method of a "simulation statistic/probabilistic" type which initially performs a "selective sampling of probable scenarios of environment variables". It then performs a statistical estimate of the probability law in the distribution of variations of a numerical productivity indicator for each local industrial system ($S_u$) by using this description sampling of joint probability distribution with state variables in a predetermined environment.

However, according to the invention, the additional aim of the process is to:

Mutually centralise and gather the principal means (information technology and personnel) of producing this selective sampling of probable scenarios for environment variables into one central site.

Only perform simple or less problematic calculations concerning information technology and specialist personnel at the vast number of local industrial systems.

According to the invention, and in its more general form, the stochastic simulation process is remarkable in that it combines the following two means:

On the one hand, at a centralised transmitting site (U), a great distance (of several kilometers, if not a several hundred kilometers) from a majority of n remote local industrial systems ($S_u^{(u=1\ldots n)}$):

In that an "smp series of probabilistic simulations" ($W_{ij}^k$ $(i=1\ldots p, j=1\ldots s, k=1\ldots m)$) with a multi-value description of environment (E) state variables ($X_i(t)^{(i=1\ldots p)}$) is repetitively generated in a centralised way at successive instants ($t_o$). According to the invention, this "smp series of probabilistic simulations" consists of:

Either a series of "probable future pseudo-states" of environment (E) variables ($X_i(t)^{(i=1\ldots p)}$).

Or a series of "probable future pseudo-variations" of these variables ($\Delta X_i(t)^{(i=1\ldots p)}$).

(these series being simulated at one (or several m where $m \geq 1$) time forecasts ($t_k^{(k=1\ldots m)} > t_o$)).

In that this "smp series of probabilistic simulations" ($W_{ij}^k$) with a multi-value description of probable future pseudo-states or pseudo-variations of environment variables is distributed in a decentralised way:

From the transmitting site (U).
Towards a vast number of remote local systems ($S_u$).
On the other hand, and independently, at each local system ($S_u$), the majority of which are a great distance from the centralised transmitting site (U), and repetitively:

In that said "smp series of probabilistic simulations" ($W_{ij}^k$) with a multi-value description of probable future pseudo-states or pseudo-variations are collected.

In that a local statistical and numerical processing is performed on said series of probabilistic simulations ($W_{ij}^k$) that are received to predict the future probabilistic behaviour of local industrial systems ($S_u$).

If necessary, the vector level of the local action parameters ($\lambda_u=(\lambda_{u1},\ldots,\lambda_{uq})$) for each local system ($S_u$) is adjusted to an optimal value that is calculated according to predetermined criteria in order to anticipate, in particular, the probable future behaviour and effectiveness of each system ($S_u$) subjected to the environment (E) during any one retained time forecast(s) ($t_k$).

FIGURES

Of the following drawings:

FIG. 1 describes a classical method recommended by the invention to capture observable measures of the environment status and their transmission by a provider of said observable data to a transmitting site of probabilistic data according to the invention.

Figure 2:
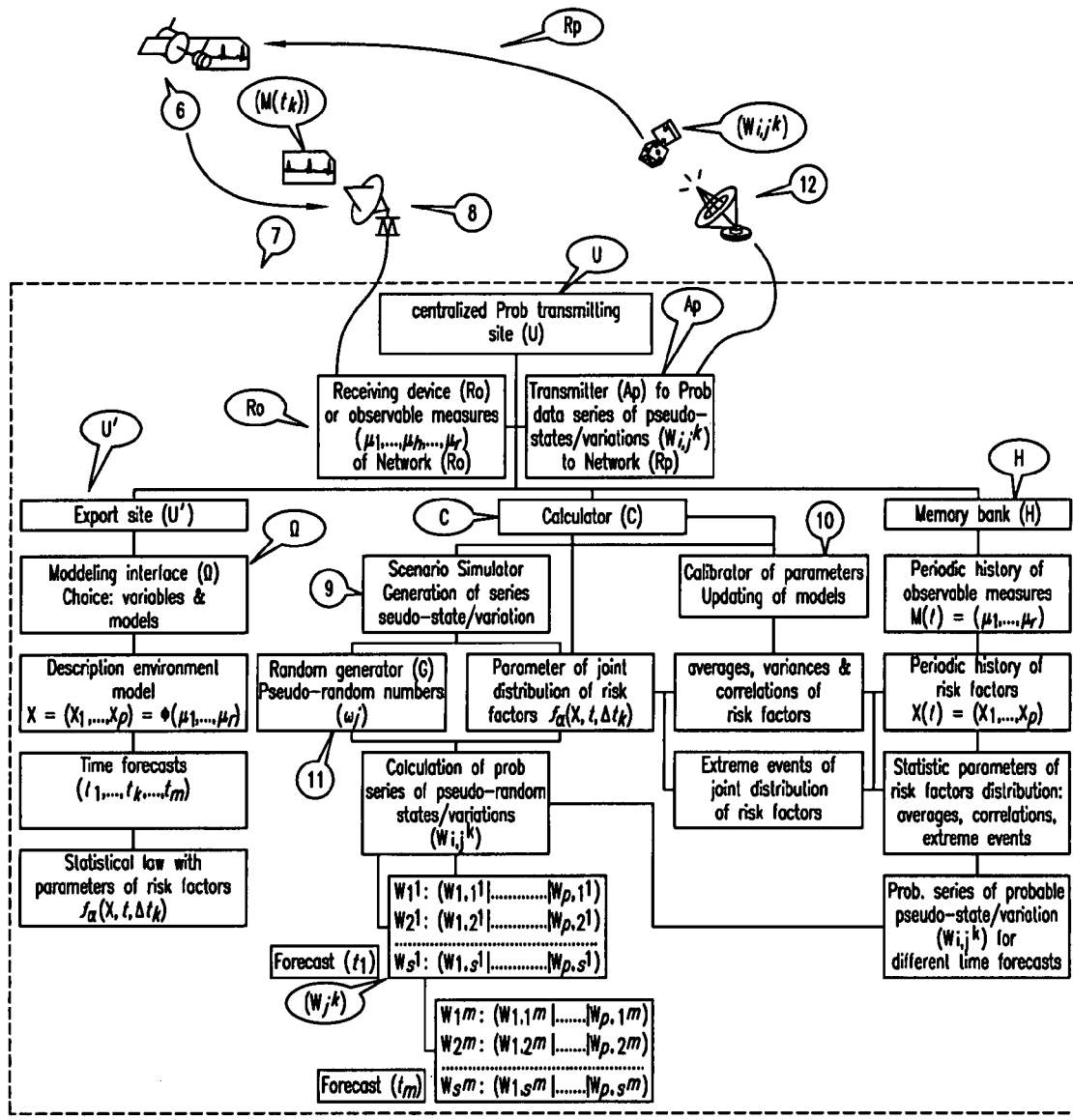

FIG. 2 describes the main stages of the process that generates a sampling of probable scenarios of environment state variables by a site transmitting probabilistic data using the Monte-Carlo Method and according to the invention.

Figure 3:
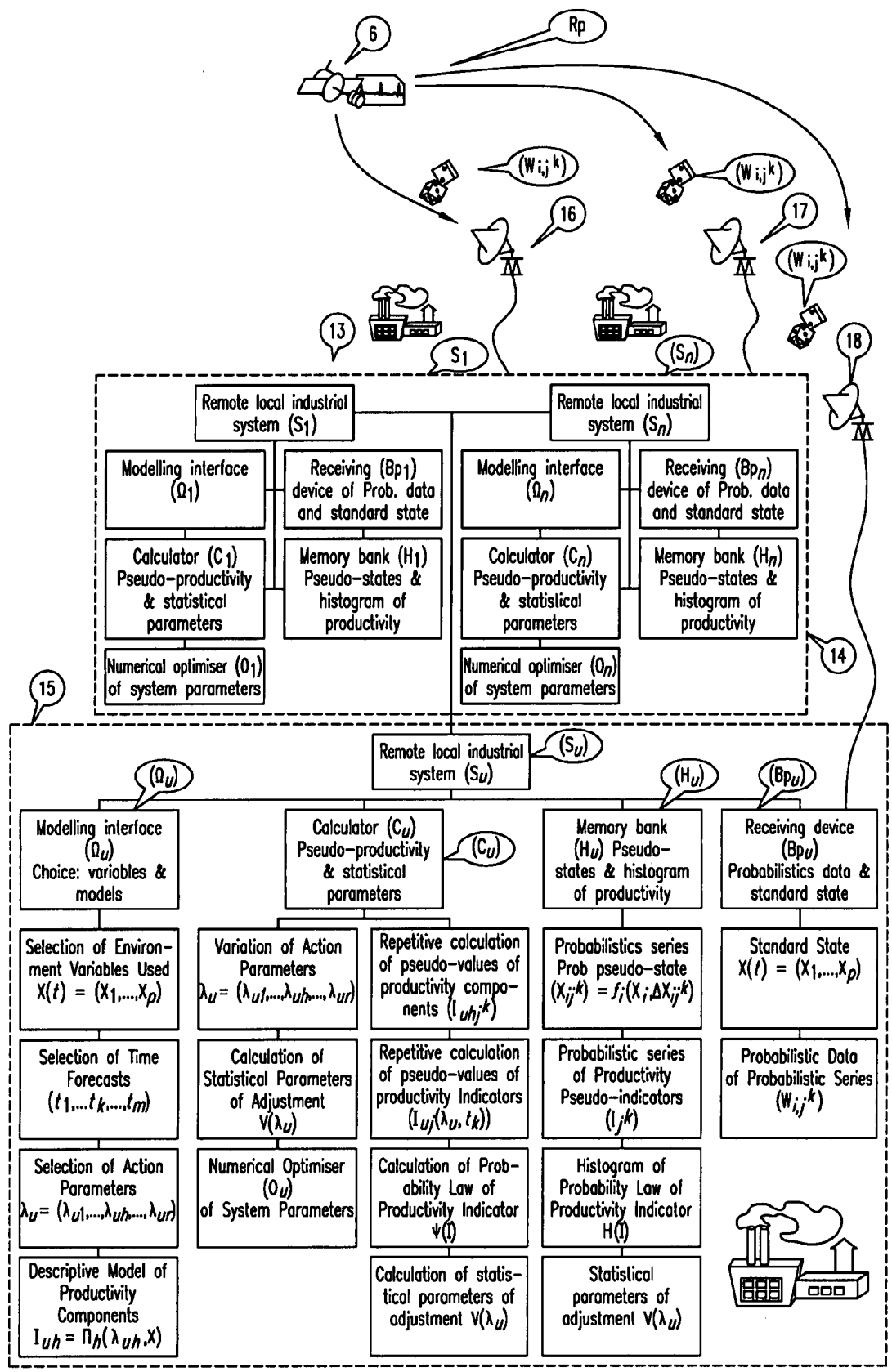

FIG. 3 describes the main stages for processing a sampling series of probable scenarios of environment state variables received by a group of three remote local industrial systems functioning according to the invention. One of the three systems is described in detail.

Figure 4:
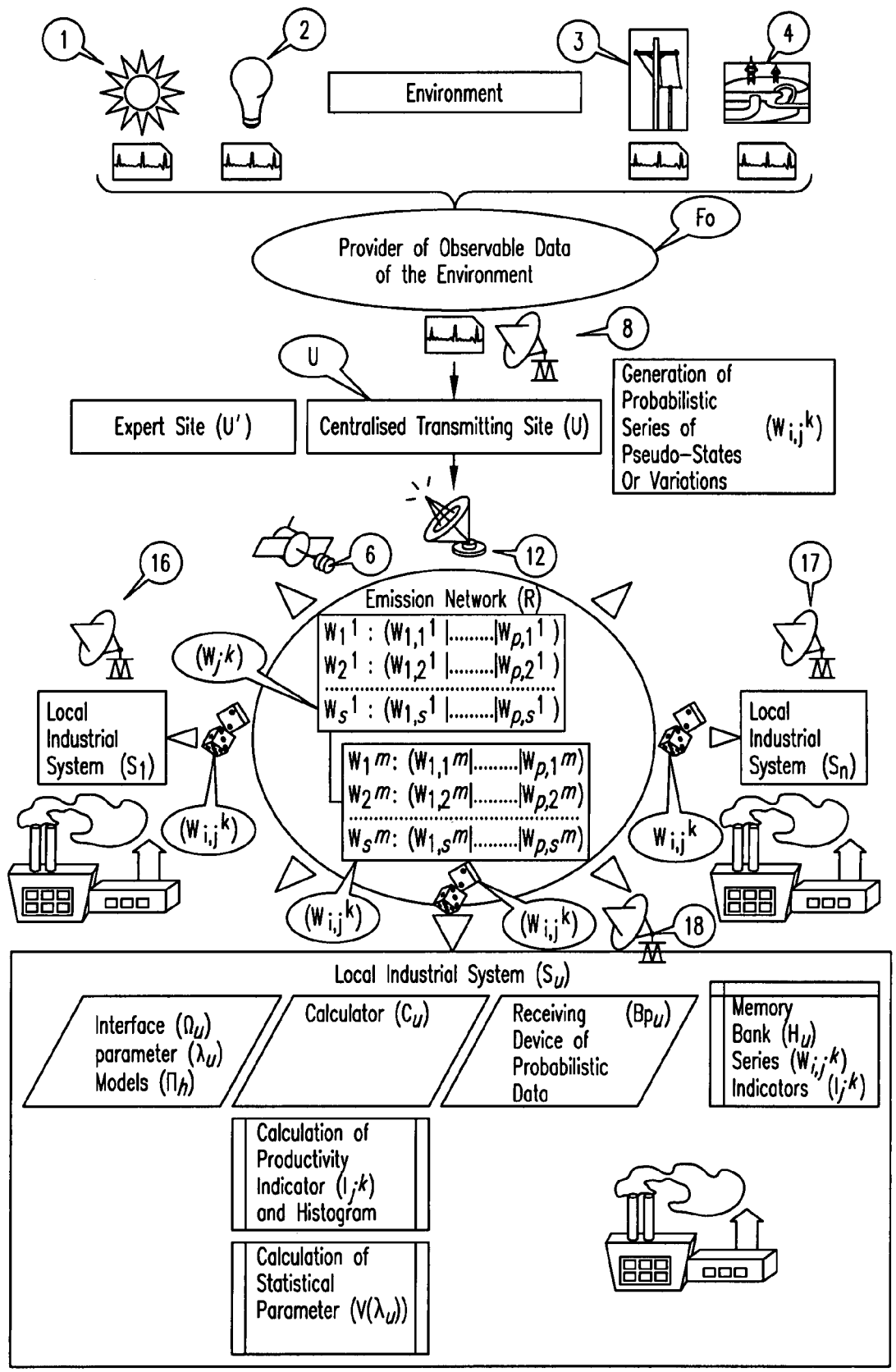

FIG. 4 describes the overall main stages of the process of repetitive stochastic simulation that prioritises by sampling probable scenarios for the probabilistic prediction of future behaviour and/or the optimisation of productivity parameters for a vast number of remote local industrial systems according to the invention.

Figure 5:
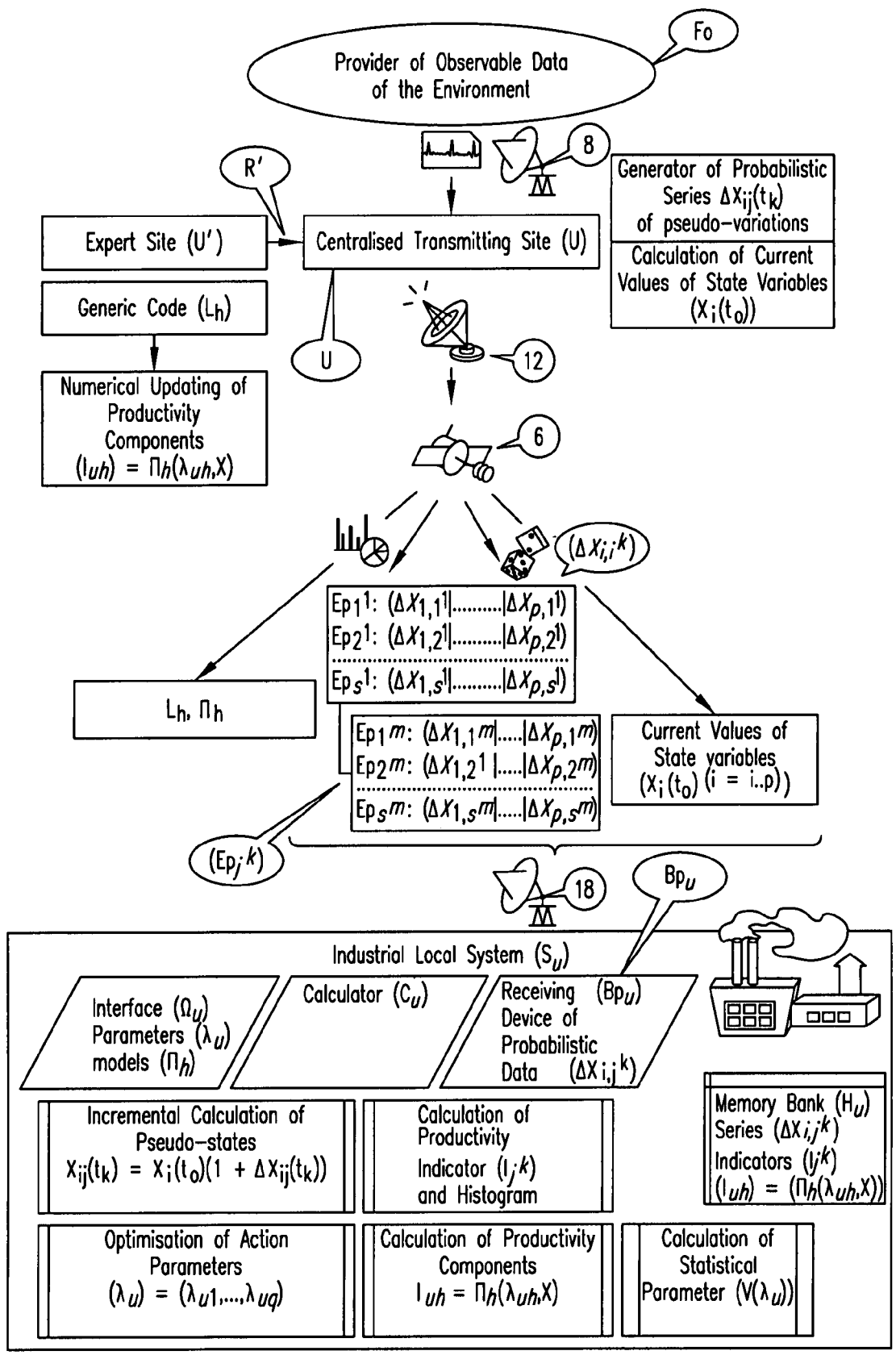

FIG. 5 describes the overall main stages of a process variant of repetitive stochastic simulation that prioritises by sampling probable variational scenarios with remote adaptation of numerical parameters to calculate productivity of each remote industrial system according to the invention.

Figure 6:
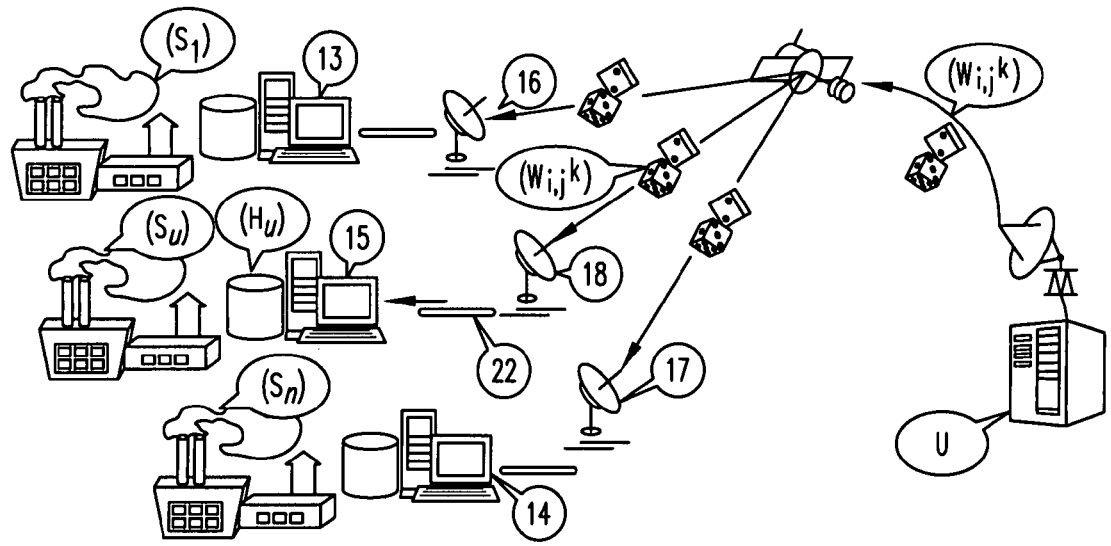
Figure 7:
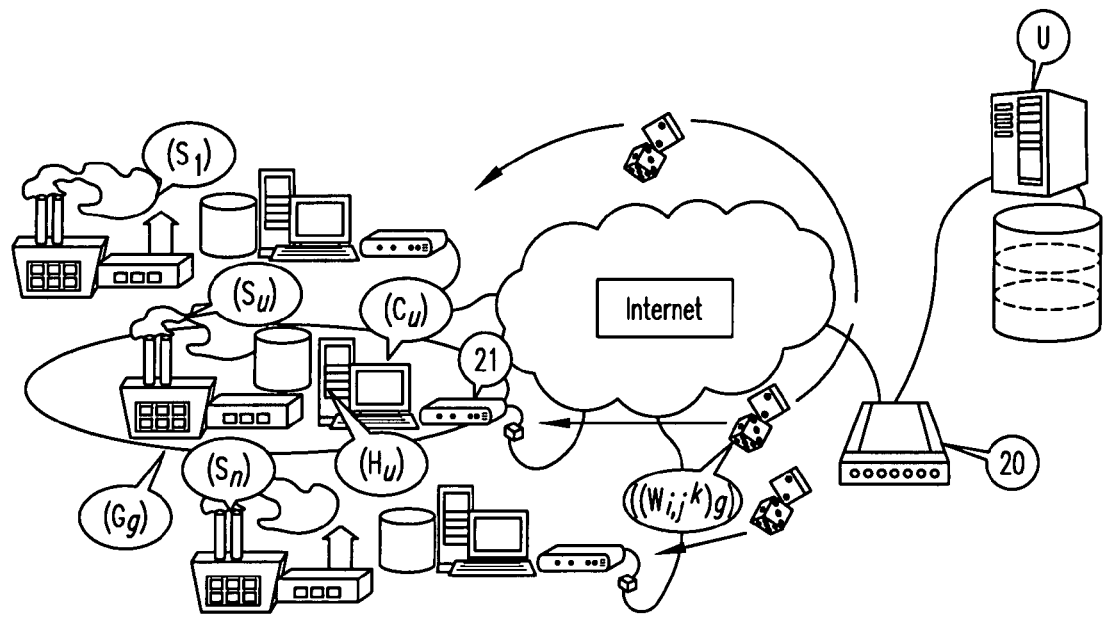
Figure 8:
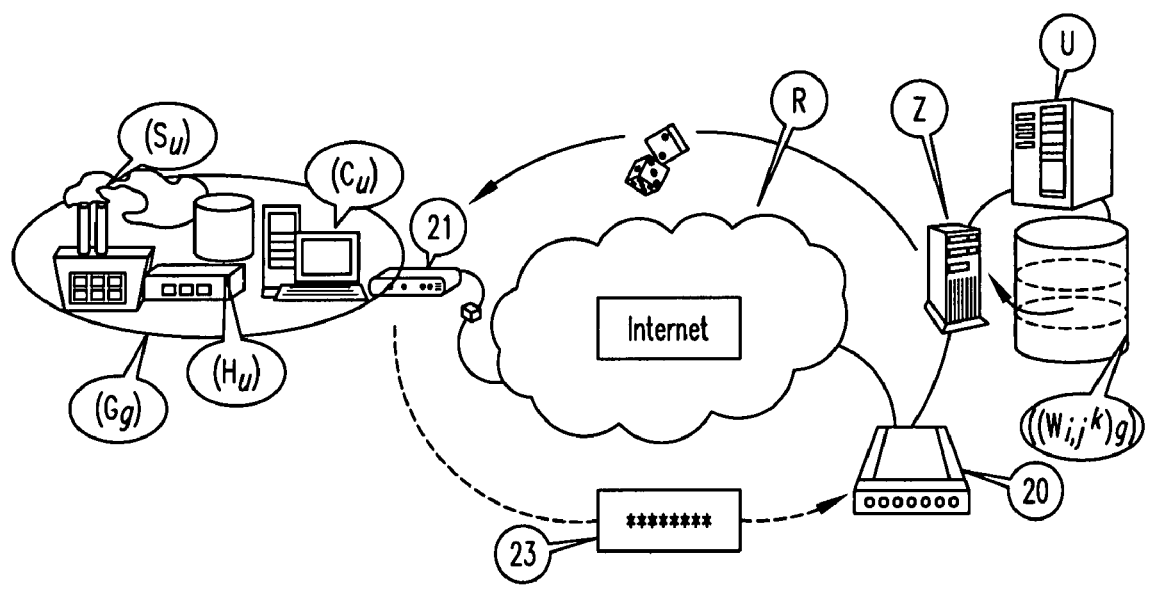

FIGS. 6, 7 and 8 describe three methods to transmit an "smp probabilistic series" from the centralised transmitting site towards a vast number of remote local industrial sites, and three methods to selectively filter the transmitted content of the "smp probabilistic series" according to the invention.

Figure 9:
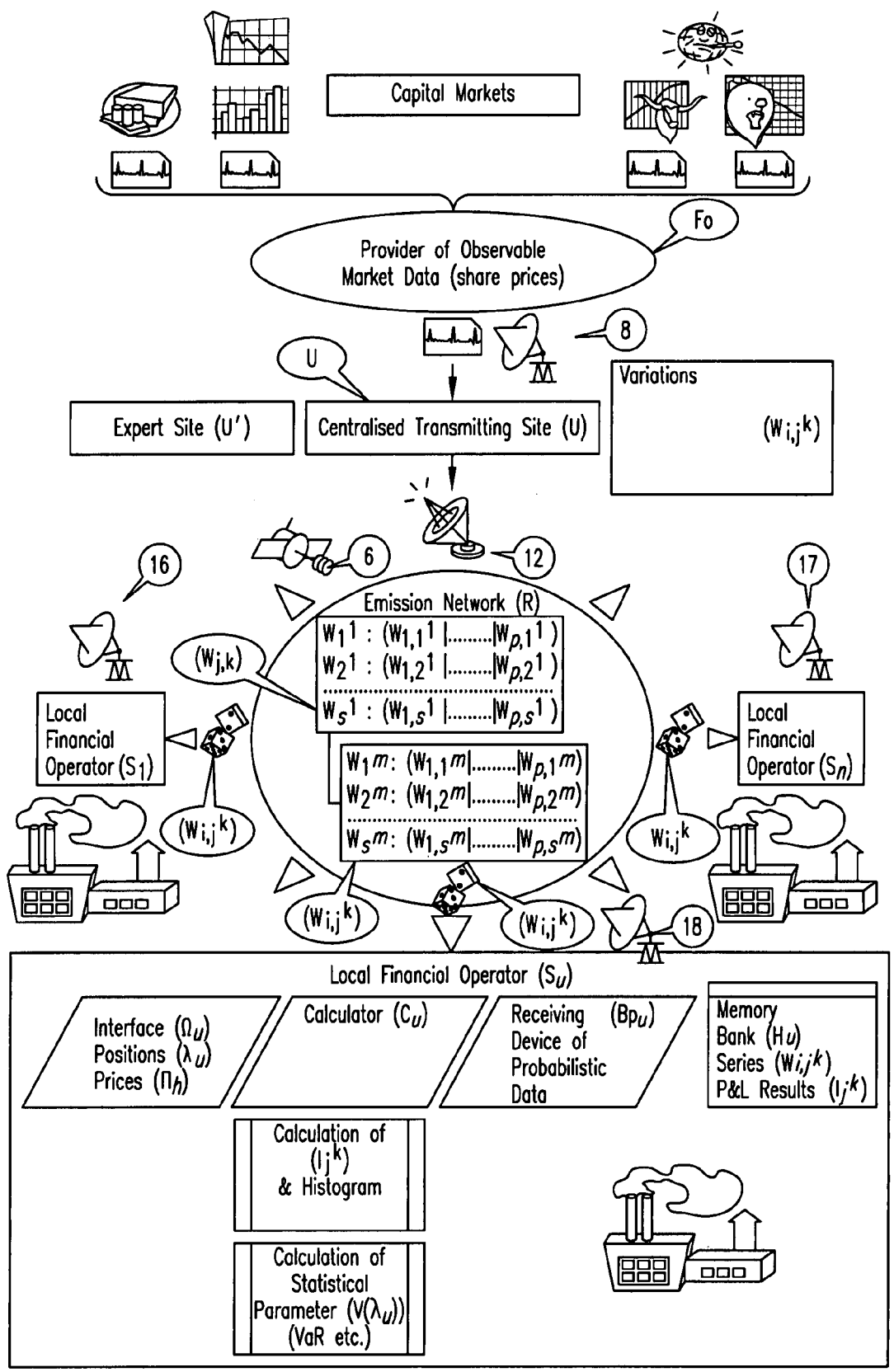

FIG. 9 describes a particular use of the process in the finance industry according to the invention.

Figure 10:
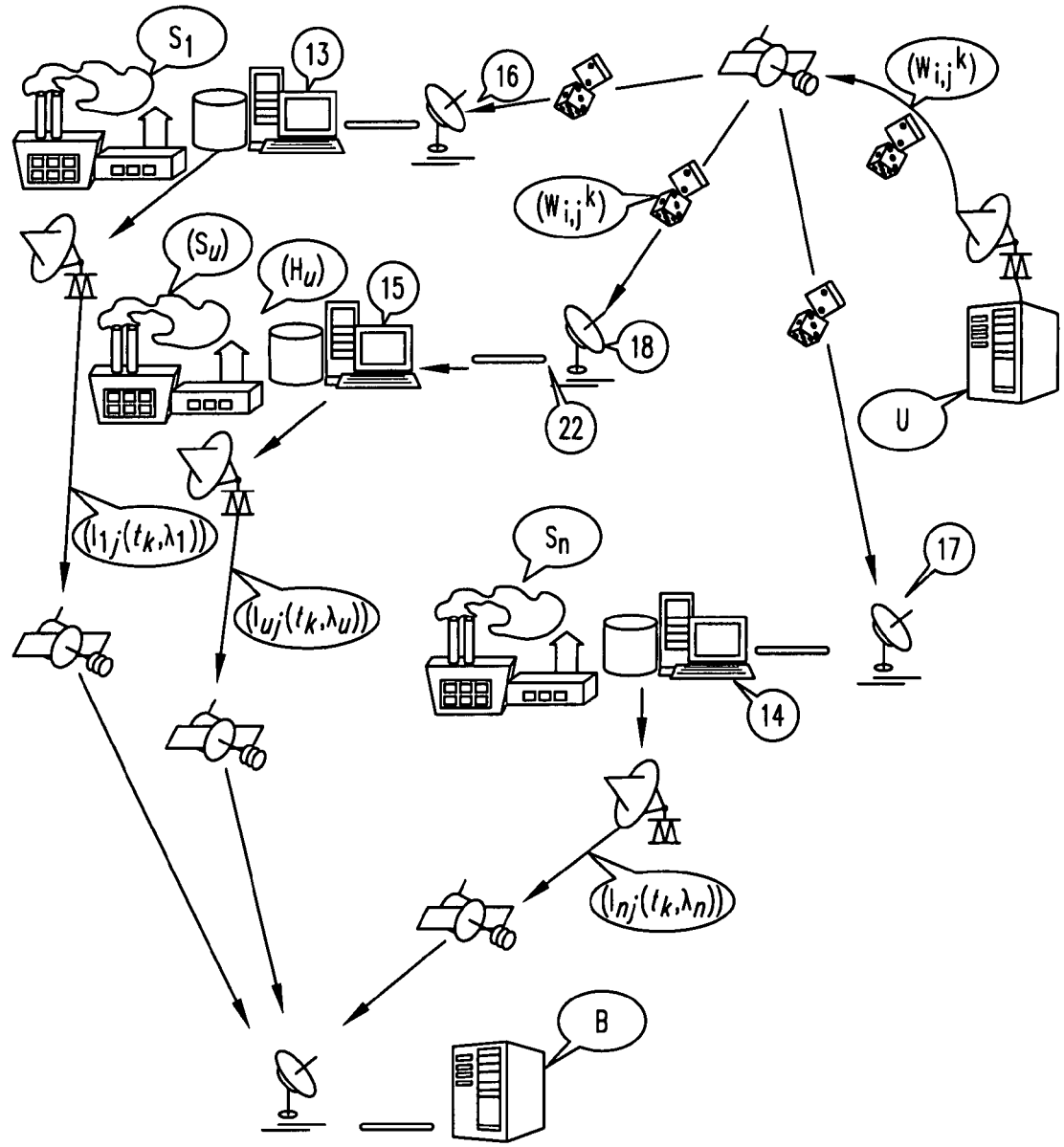

FIG. 10 describes an alternative use of the invention to perform grouped probabilistic optimisation of certain groups of local industrial systems.

DESCRIPTION OF THE INVENTION

FIGS. 1, 2 and 3 illustrates how the main stages of the stochastic simulation process are generally organised to generate repetive statistical sampling in a centralised way and remote transmission of probable scenarios for the probabilistic prediction of future behaviour and/or the optimisation of productivity parameters for a vast number of remote local industrial systems ($S_u$). In the retained example, the remote local industrial systems ($S_u$) are power stations ($S_1, \ldots, S^u \ldots, S_n$) placed in the same environment (E) and making up, in this particular case, an electrical distribution network in a state or region.

FIGS. 1 and 4 show the environment (E) of power stations connected to a same network and influenced by random phenomena, such as climate (1) that directly affects factory performance (power station productivity, barrier levels), demand characteristics (2) (quality, price) that affect power station revenue, network availability (3) that influences the factory functioning pattern and primary energy characteristics (4) that influence supply costs. These random phenomena regarding network environment (E) are given by way of example. However, it is understood that the random phenomena to be identified are far more extensive and variegated in practice.

Even local random phenomena, as are climatic phenomena, may not be considered independently from phenomena common to all factories, such as petrol price or the demand level on the network. Thus, temperature close to a factory not only acts upon factory productivity (and therefore its marginal cost) but also interacts with demand level and electricity price. There are strong chances of seeing the local temperature change in correlation with the temperature close to other factories, and therefore to see the latter's marginal cost vary in the same direction and further interact with demand level. Seeking to optimise a factory margin with a statistical analysis of local weather parameters separate from that of global parameters would lead to obvious optimisation mistakes since local and global parameters interact within the same framework of a common global environment.

FIGS. 1, 4 and 5 show the data providing centre ($F_o$) which is responsible for collecting observable data that describes the global environment (E) status of an electrical network. In the particular case of the electricity industry, the data providing centre ($F_o$) may form part of the company that manages the electrical network organisation. However, within other fields, particularly the finance industry, the data providing centre ($F_o$) is an independent entity (such as Reuters and Bloomberg) that commercially provides observable data to a variety of clients.

A series of r captors ($\gamma_h^{(h=1\ldots r)}$) installed at different points in the environment (E) are designed to observe the state of the environment (E). The data provider ($F_o$) remotely collects at each instant (t) the r measures of the environment status ($\mu_h(t)^{(h=1\ldots r)}$) from the captors. At each selected sample instant ($t_k$), these r measures constitute temporal vector components to measure the environment ($M(t_k))=(\mu_h(t_k)^{(h=1\ldots r)})$. The data provider ($F_o$) is equipped with a transmitting device ($A_o$) of observable data. The latter transmits the emission of observable data on to a network ($R_o$):

Either the directly collected measures from the captors (observable variables).

Or results of deterministic algebraic calculations, such as averages, carried out by the data provider ($F_o$) on these measures (quasi-observable variables).

Subsequently, observable and quasi-observable variables which we shall globally call "observable variables" are assimilated. The case depicted in FIG. 1 shows the emission network ($R_o$) of observable data represented in a diagram by a statellite emission dish (5) that transmits observable data (measures) ($M(t_k))=(\mu_h(t_k)^{(h=1\ldots r)})$ of the environment (E) to a satellite (6).

According to the invention, a centralised transmitting site (U) is generally described in FIG. 2. It usually consists of a computer system (7) that is equipped with the following main features:

A modelling interface ($\Omega$) that allows a mathematician operator to choose between different models and variables.

A simulation calculator (C) to carry out numerical and statistical calculations.

A memory bank (H) for probabilistic data.

A receiving device ($B_o$) for observable measures.

A transmitting device ($A_p$) for series of probabilistic simulations.

This centralised transmitting site (U) is a great distance (several kilometers, if not several hundred kilometers) from a majority of the n remote local industrial systems ($S_u^{(u=1\ldots n)}$), the power stations ($S_1, \ldots, S_u, \ldots, S_n$), that are distributed over the entire state territory and will appear in FIGS. 3 to 8. The receiving device ($B_o$) for observable measures is represented in a diagram by a satellite reception dish that receives observable data (8) from the satellite (6) in a periodic and continuous flow. The data concerns the r environment measures ($M(t_k)$)= ($\mu_h(t_k)^{(h=1\cdots r)}$) transmitted by the data provider ($F_o$) via the emission network ($R_o$) of observable data. The modelling interface ($\Omega$) is preferably located at the centralised transmitting site (U). In the more general of cases, it is located within the expert site (U') that may be separate from the transmitting site (U) but in all cases at a distance (of several kilometers, if not several hundred kilometres) from a majority of n remote local industrial systems ($S_u^{(u=1\cdots n)}$). At the modelling interface ($\Omega$) or the expert site (U'), the following choices can be made:

- p variables ($X_i^{(i=1\cdots p)}$) of the environment (E) also known as risk factors.
- Time forecasts ($t_k^{(k=1\cdots m)}$) of different simulations.
- The descriptive numerical model of the environment ($\Phi$), which defines all p state variables ($X_i(t)^{(i=1\cdots p)}$)=($\Phi(\mu_1(t), \ldots, \mu_r(t))$) in relation to observable measures ($\mu_h(t)^{(h=1\cdots r)}$) (where generally $p \leq r$ but sufficiently great) in such as way that all environment variables ($X_i(t)^{(i=1\cdots p)}$) physically described at each sampling instant ($t_k$) the entire global environment (E).
- A statistical law with parameters (model) ($f_a(X_1, \ldots, X_p; t; \Delta t_k)$) for the joint behaviour of risk factors, at time (t) and by time periods ($\Delta t_k^{k=1\cdots m}$), and of state variables ($X_i(t)^{(i=1\cdots p)}$) depicted in its dense joint distribution.

The statistical law ($f_a$) with parameters (numerically described) is generally chosen by a mathematician specialising in statistical models. It is determined by historical observations. In particular, it may entail normal laws, normal logs and so on, or more generally, a joint statistic distribution of p environment variables ($X_i(t_k)^{(i=1\cdots p)}$) or their temporal variations ($\Delta X_i(t_k)^{i=1\cdots p}$) and is assessed through appropriate and classical statistic tests (averages, variances, correlations, breaks, extreme behaviours and so forth).

As the observable environment data is received, be it by request or continuously, the memory bank (H) is updated in which the periodic history of value measures ($\mu_h(t)^{(h=1\cdots r)}$) is registered. The calculator (C) calculates the p variables ($X_i(t)^{(i=1\cdots p)}$)=($\Phi(\mu_1(t), \ldots, \mu_r(t))$) at each successive sampling period with the aid of a descriptive numerical model of the environment ($\Phi$) and the measures vector (M(t)),. Preferably, the calculator (C) calculates and repetitively updates the variations history of p state variables ($\Delta X_i(t)^{(i=1\cdots p)}$), which it registers in its memory bank (H). Variations of state variables are understood to be either the difference or ratio of two values of a variable at successive instants, or more generally, any numerical value describing variations (absolute or relative) of the variable between two successive instants.

The calculator (C) is equipped with a simulation system (9) or scenarios, a calibrating system (10) for the statistical law ($f_a$) with parameters so that it conforms with stored historical observations in the memory bank (H), and a random generator (11) enabling "smp probabilistic simulations" ($W_{ij}^k$) with multi-value descriptions of probable future pseudo-states or pseudo-variations of state variables ($X_i(t)^{(i=1\cdots p)}$) to be repetitively created.

Various functioning methods of the scenario simulation system (9) are described further on. Some generate series of simulations of state variables ($X_i(t)^{(i=1\cdots p)}$) and other, series of simulations of variations of p state variables ($\Delta X_i(t)^{(i=1\cdots p)}$). In such a way that, at the centralised transmitting site (U), an "smp series of probabilistic simulation" ($W_{ij}^{k,j=1\ldots p, j=1\ldots s, k=1\ldots m}$) with multi-value descriptions of probable future pseudo-states or pseudo-variations of the environment (E) is numerically and repetitively generated at successive instants ($t_o$) by using the dense joint distribution of the statistical law with parameters ($f_a(X_1, \ldots, X_p; t; \Delta t_k)$) retained from the joint behaviour within the time (t) of state variables ($X_i$).

According to an initial application mode, this "smp series of probabilistic simulation" is an "smp probabilistic series" ($X_{ij}^k$) of pseudo-states formed by s×m p-uplets with a multi-value sampling of future pseudo-states ($X_{ij}(t_k)^{(i=1\cdots p, j=1\cdots s, k=1\cdots m)}$) including possible s×m×p numerical values of probable future pseudo-values for p state variables ($X_i(t)^{(i=1\cdots p)}$) and constitutes:

- For each m (m≥1) time forecast ($t_k^{(k=1\cdots m)}$) of the simulation.
- Of s (where s is much greater than >> 1) possible future pseudo-states ($X_j^{k(j=1\cdots s)}$)=($X_{ij}(t_k)^{(i=1\cdots p, j=1\cdots s)}$) of the vector for p state variables ($X_i(t_k)^{(i=1\cdots p)}$).

According to a second application mode described in FIG. 5, this "smp variational probabilistic series" ($\Delta X_{ij}^k$) is formed by s×m p-uplets of a multi-value sampling of future pseudo-variations ($\Delta X_{ij}(t_k)^{(i=1\cdots p, j=1\cdots s, k=1\cdots m)}$) by using the standard value of state variables ($X_i(t_o)^{(i=1\cdots p)}$) and including s×m×p numerical values of probable future pseudo-variations for p state variables ($X_i(t_k)^{(i=1\cdots p)}$) and constitutes:

- For each m (m≥1) time forecast ($t_k^{(k=1\cdots m)}$) of the simulation.
- Of s (where s is much greater than >> 1) possible future numerical pseudo-variations ($\Delta X_{jk}^{(j=1\cdots s)}$)=($\Delta X_{ij}(t_k)^{(i=1\cdots p, j=1\cdots s)}$) of the vector for p state variables ($X_i(t_k)^{(i=1\cdots p)}$).

As it appears in FIGS. 2, 3, 4 and 5 with the aid of the transmitting device ($A_p$) for probabilistic simulation series with which the centralised transmitting site (U) is equipped, said "smp probabilistic series" ($W_{ij}^k$) with a multi-value description of probable future pseudo-states or pseudo-variations is repetitively transmitted at successive instants ($t_o$), including the s×m×p numerical pseudo-values that consist of: (case 1) said "smp probabilistic series" ($X_{ij}^k$) of pseudo-values of state variables ($X_{ij}(t_k)^{(i=1\cdots p, j=1\cdots s, k=1\cdots m)}$), and/or (case 2) said "smp variational probabilistic series" ($\Delta X_{ij}^k$) of pseudo-variations ($\Delta X_{ij}(t_k)^{(i=1\cdots p, j=1\cdots s, k=1\cdots m)}$).

As observed in FIGS. 2, 3, 4 and 5, this transmission of probabilistic simulations is done in a decentralised way from the transmitting site (U) at successive instants ($t_o$) towards the vast number of remote local systems ($S_u$) via the emission network ($R_p$) of probabilistic data. In this particular case, the transmitting device ($A_p$) for the probabilistic simulation series is represented in a diagram by a satellite emission dish (12) for probabilistic data, namely the "smp probabilistic series" ($W_{ij}^k$), which it successively transmits to the satellite (6). In other words, ($R_o$) and ($R_p$) networks are one and the same. It is understood that another satellite (other than that used for receiving observable data) or any other type of data transmission method, such as the Internet, could be used for the transmission of probabilistic data.

According to the invention, FIG. 3 shows how all local industrial systems ($S_u$) are generally organised. In the example pertaining to the electricity industry, it involves all power stations ($S_1, \ldots, S_u, \ldots, S_n$) whose industrial behaviour (production of energy kWs) is affected by the environment (E) described in FIG. 1.

Each local industrial system ($S_u^{(u=1\cdots n)}$) consists of a fairly similar local computer system (13, 14, 15). The makeup of the local computer system (15) for the industrial system ($S_u$) is described in FIG. 3. It is equipped with the following main features:

- A local modelling interface ($\Omega_u$) to configure the site ($S_u^{(u=1\cdots n)}$) according to different variables and models.
- A local calculator (C) to carry out numerical and statistical calculations.
- A local memory bank ($H_u$).
- A local receiving device ($Bp_u$) for probabilistic data that is designed and adjusted in order to receive the flow of probabilistic data from the satellite (6).

Note that each local industrial system is equipped with a local satellite dish (16, 17, 18) to receive probabilistic data and a local reception device for probabilistic data. Independently, and within each local industrial system, a succession of "smp probabilistic series" ($W_{ij}^k$) with a multi-value description of probable future pseudo-states or pseudo-variations including s×m×p numerical values ($W_{ij}^k = X_{ij}^k$ or $\Delta X_{ij}^k$) are transmitted by the satellite (6) and repetitively collected with the aid of a satellite dish (18) and the local reception device.

Through the local interface ($\Omega_u$), m' (m'≤m) time forecasts are retained from the m said time forecasts ($t_k^{(k=1\cdots m)}$). If necessary (in case 2 described above and represented in FIG. 5), where the local industrial site ($S_u$) only receives an "smp variational probabilistic series" ($W_{ij}^k$) from the satellite (6), said corresponding (at least for the retained m' time forecasts ($t_k$)) "smp probabilistic series of pseudo-states" ($W_{ij}^k$) consisting of pseudo-samplings for future states ($X_{ij}(t_k)^{(i=1\cdots p, j=1\cdots s, k=1\cdots m)}$) is locally calculated.

For each retained m' time forecast ($t_k$), a local systems analysis model ($D_u$) that has been previously set in order to determine the productivity indicator ($I_{uj}^k = D_u(\lambda_u, X_{ij}(t_k))$) within each s scenario of received simulations (j=1, . . . ,s) is numerically applied:

For at least a particular value ($\lambda_u = (\lambda_{u1}, \ldots, \lambda_{uq})$) of the vector ($\lambda_u$) of local action parameters (which may be varied).

To each simulated s p-uplets of state variables ($X_{ij}(t_k)^{(i=1\cdots p)}$) that corresponds to said time forecast ($t_k$) retained from the probabilistic pseudo-state series ($X_{ij}(t_k)^{(j=1\cdots s)}$).

Thus, the corresponding simulated s pseudo-values of the productivity indicator ($I_{uj}(t_k, \lambda_u) = D_u(\lambda_u, X_{ij}(t_k))^{(i=1\cdots p, j=1\cdots s)}$) are determined. The corresponding s values of the productivity indicator ($I_{uj}(t_k, \lambda_u)^{(j=1\cdots s)}$) are grouped together and arranged according to the productivity level ($I_{uj}$). The histogram ($\Gamma(I_u)$) is calculated and stored in the local memory bank ($H_u$) as is the probability distribution (as a number or percentage) ($\Psi_u(I_u)$) of the level reached by the local productivity indicator ($I_u$) in the configuration ($\lambda_u$) according to the local model ($D_u$). A statistical calculation deduces the value of at least one chosen statistical parameter of adjustment ($V(\lambda_u)$) (such as average, spread type, Value at Risk, utility and so forth) that is characteristic of the probability distribution ($\Psi(\lambda_u, I)$) for productivity levels ($I_u(t_k, \lambda_u)$) according to the vector of local action parameters ($\lambda_u = (\lambda_{u1}, \ldots, \lambda_{uq})$).

If necessary, a numerical optimisation (according to predetermined criteria) of one or many chosen statistical parameters of adjustment ($V(\lambda_u)$) is performed within each local system ($S_u$). The vector level of local action parameters ($\lambda_u = (\lambda_{u1}, \ldots, \lambda_{uq})$) for each local system ($S_u$) is then adjusted to a calculated optimal value according to predetermined criteria, notably in order to anticipate the future probable behaviour and effectiveness of each system ($S_u$) subjected to the environment (E) during any one retained time forecast ($t_k$).

The aim of one particular application mode of the invention described in FIGS. 3 and 5 is to render modelling of the productivity indicator corresponding to each local action parameter ($\lambda_{uh}$) suitable for each local industrial system ($S_u^{(u=1\cdots n)}$). To this end, a generic code ($L_h$) (that is not dependent upon the local system ($S_u$)) is assigned to each local action parameter ($\lambda_{uh}^{(h=1\cdots q)}$) at the expert site (U'). A "productivity assessment system" ($\pi_h$) that is regularly updated is set up for each code ($L_h$), i.e. a programme (produced as a digital file) that is able to calculate, according to the p-uplet of state variables ($X = (X_i^{(i=1\cdots p)})$) and the local action parameter ($\lambda_{uh}$), the corresponding productivity component ($I_{uh} = (\pi_h(\lambda_{uh}, X))$) in such a way that, for each local system ($S_u$), said local systems analysis model ($D_u$) consists simply in adding up the components ($I_{uh}$) of the productivity indicator corresponding to each local action parameter ($\lambda_{uh}$):

$$D_u(\lambda_u, X) = \sum_{h=1}^{q} \Pi_h(\lambda_{uh}, X) \quad (*)$$

The expert site (U') is linked up to the centralised transmitting site by a network (R') through which it transmits the adaptive numerical definitions of the productivity components ($I_{uh}^k = (\pi_h(\lambda_{uh}, X_j^k))$).

On the one hand, the "smp probabilistic series" ($W_{ij}^k$) with its multi-value description of probable future pseudo-states or pseudo-variations is repetitively transmitted at successive instants ($t_o$) from the centralised transmitting site by using the retained joint behaviour statistical model ($f_q(X_1, \ldots, X_p; t; \Delta t)$) in time (t) of state variables ($X_i^{(i=1\cdots p)}$). On the other hand, as each new code ($L_h$) appears or adjustment to the productivity assessment system ($\pi_h$) is made, the pair ($L_h, \pi_h$) is transmitted as a digital file in a centralised way.

At each remote local industrial system ($S_u$), the productivity component ($I_{uhj}^k = (\pi_h(\lambda_{uh}, X_j^k))$) is calculated:

For each m' (m'≤m) retained time forecast ($t_k$) of the simulation at a local scale ($S_u$).

For each j=1, . . . , s (where s is much greater than >> 1) of possible numerical pseudo-states ($X_j^{k(j=1\cdots s)}$) received or recreated by using the pseudo-variation series ($\Delta X_{ij}^k$).

For each h=1, . . . q of local action parameters ($\lambda_{uh}$).

Subsequently, in summary and according to the above formula (*) of the productivity indicator ($I_{uj}^k$), its histogram is calculated followed by the retained statistical parameter ($V(\lambda_u)$). Finally, the vector of local action parameters ($\lambda_u$) is applied in order to optimise the value of the statistical parameter (V).

A particular case of the above application mode consists in productivity assessment systems ($\pi_h$) being proportional to the local action parameter ($\lambda_{uh}$), ie that:

$$\pi_h(\lambda_{uh}, X) = \lambda_{uh} \pi_h(X)$$

where ($\pi_h$) is called the "marginal productivity assessor". In this case, the local systems analysis model ($D_u$) amounts to creating a scalar product between the vector of local action parameters ($\lambda_{uh}$) and the vector of marginal productivity ($\pi(X) = (\pi_h(X)^{(h=1\cdots q)}$):

$$D_u(\lambda_u, X) = (\lambda_u | \pi(X)) \quad (**)$$

Calculation of the statistical parameter ($V(\lambda_u)$) at the local site ($S_u$) is thereby simplified and its optimisation accelerated by previous registration of the marginal productivity series ($\pi_h(X_j^k)_{(h=1\ldots q, j=1\ldots s, k=1\ldots m)}$) in the memory bank ($H_u$) of the local calculator ($C_u$).

A first particular variant of the invention's application is also described in FIG. 4. It concerns the case where, at a centralised transmitting site (U), a variational probabilistic series $(\Delta X_{ij}^k)$ formed by s×m p-uplets of a multi-value sampling of pseudo-variations $(\Delta X_{ij}(t_k)^{(i=1 \cdots p, j=1 \cdots s, k=1 \cdots m)})$ of future states taken from the standard state of state variables $(X_i(t_o)^{(i=1 \cdots p)})$ is numerically and repetitively generated at successive instants $(t_o)$ by using the retained joint behaviour statistical model $(f_a(X_1, \ldots, X_p; t; \Delta t))$ in time (t) of state variables $(X_i)$. This series of pseudo-variations includes s×m×p numerical values of probable future pseudo-variations for p state variables $(X_i(t_k)^{(i=1 \cdots p)})$. It is constituted for each m (m≧1) time forecast $(t_k^{(k=1 \cdots m)})$ of the simulation and each s (where s is much greater than >> 1) of possible numerical pseudo-variations $(\Delta X_{ij}(t_k)^{(j=1 \cdots s)})$ for p state variables $(X_i(t_k)^{(i=1 \cdots p)})$. This "smp variational probabilistic series" $(\Delta X_{ij}^k)$ of pseudo-variation states $(\Delta X_{ij}(t_k)^{(i=1 \cdots p, j=1 \cdots s, k=1 \cdots m)})$ is transmitted repetitively from the transmitting site (U) in a decentralised way towards the various remote local systems $(S_u)$. This is performed by the transmitting device $(A_p)$ of probabilistic simulation series with the aid of a satellite emission dish (12) for probabilistic data and via a satellite (6). Independently, and at each local system $(S_u)$, the local receiving device $(Bp_u)$ for probabilistic data repetitively gathers via the local satellite reception dish (16, 17, 18) of probabilistic data at each instant $(t_o)$ and according to a determined frequency, if not at each adjustment of variables $(X_i)$, the standard value of state variables $(X_i(t_o)^{(i=1 \cdots p)})$. It also gathers said "smp variational probabilistic series" $(\Delta X_{ij}^k)$ of state variations $(\Delta X_{ij}(\Delta t_k)^{(i=1 \cdots p, j=1 \cdots s, k=1 \cdots m)})$ in relation to time increment $\Delta t_k$ transmitted by the central site (U). This data is memorised within the local memory bank $(H_u)$. The local calculator $(C_u)$ locally assesses said "smp probabilistic series" $(X_{ij}^k)$ of pseudo-states $(X_{ij}(t_k)^{(i=1 \cdots p, j=1 \cdots s, k=1 \cdots m)})$ at future instants $(t_k)=(t_o+\Delta t_k)$ that correspond to the variational series by incremental numerical calculation of the type:

$$X_{ij}(t_k)=X_i(t_o)(1+\Delta X_{ij}(t_k))$$

Any other formula (addition, exponential and so forth) that implicates the "smp variational probabilistic series" $(\Delta X_{ij}^k)$ coming from the centralised transmitting site (U) and the standard value of state variables $(X_i(t_o)^{(i=1 \cdots p)})$.

A particular application method for this first variant is that described further above with reference to FIG. 4. At a centralised transmitting site (U), an "smp variational probabilistic series" $(\Delta X_{ij}^k)$ as described above is numerically and repetitively generated at successive instants $(t_o)$. The current value of state variables $(X_i(t_o)^{(i=1 \cdots p)})$ is repetitively collected and memorised. The "smp variational probabilistic series" $(\Delta X_{ij}^k)$ of pseudo-state variations $(\Delta X_{ij}(t_k)^{(i=1 \cdots p, j=1 \cdots s, k=1 \cdots m)})$ and the standard value of state variables $(X_i(t_o)^{(i=1 \cdots p)})$ are repetitively transmitted and in a decentralised way from the transmitting site (U) towards the various remote local systems $(S_u)$.

A second particular combination variant for the application of the invention is described in reference to FIGS. 1 and 4. As shown previously in FIG. 1, and at different points in the environment (E), a series of r captors $(\gamma_h^{(h=1 \cdots r)})$ that observe the environment (E) status transmit at each instant (t) a set of r measures of the environment (E) status $(\mu_h(t)^{(h=1 \cdots r)})$. The case described in FIGS. 1 and 4 shows the transmitting site (U) as subscriber to environment data provided by the observable data provider $(F_o)$ which operates the captors' network $(\gamma_h^{(h=1 \cdots r)})$. The designer site (U'), quite a distance from the majority of the n remote local industrial systems $(S_u^{(u=1 \cdots n)})$, is where a numerical model describing the environment $(\Phi)$ is previously established and defines all p states variables $(X_i(t)^{(i=1 \cdots p)})=(\Phi(\mu_1(t), \ldots, \mu_r(t)))$ in relation to measures $(\mu_h(t)^{(h=1 \cdots r)})$ (where generally p≦r), in such a way that all environment variables $(X_i(t)^{(i=1 \cdots p)})$ physically describe the status of the environment (E) in its entirety at each sampling instant $(t_k)$. However, it is understood that this operation may also be performed from the transmitting site (U), or on its behalf, in particular when the designer site (U') is located within the transmitting site (U). The centralised transmitting site (U) is where the r environment measures $(\mu_h(t)^{(h=1 \cdots r)})$ are remotely collected and memorised. At each sampling instant $(t_k)$, these r measures constitute the components of a temporal vector to assess the environment $(M(t_k))=(\mu_h(t_k)^{(h=1 \cdots r)})$. Subsequently, at each successive sampling $(t_k)$ period, and with the aid of a numerical model describing the environment $(\Phi)$ and the measures vector $(M(t))$, the p state variables $(X_i(t)^{(i=1 \cdots p)})=(\Phi(\mu_1(t), \ldots, \mu_r(t)))$ are calculated.

The invention recommends two particular methods of repetitive stochastic simulation that prioritises through probable scenario sampling in order to predict probable future behaviour and/or optimise productivity parameters of a number of remote local industrial systems $(S_u)$.

The first method suggested by the invention of repetitive stochastic simulation that prioritises through probable scenario sampling consists in its combined use with the method known as Monte-Carlo. According to this first method, which is described in FIG. 2, a history of values for p state variables $(X_i(t)^{(i=1 \cdots p)})$ of the common global environment (E) throughout time is maintained and updated at the centralised transmitting site (U). The "smp probabilistic series" $(W_{ij}^k)$ with a multi-value description of probable future pseudo-states or pseudo-variations of environment (E) is numerically generated and repetitively transmitted at successive instants $t_o$ according to the method known as "Monte-Carlo" by using the retained statistical model $(f_a(X_1, \ldots, X_p; t; \Delta t_k))$ of joint behaviour within the time (t) of state variables $(X_i)$ and the memorised history of values for p state variables $(X_i(t)^{(i=1 \cdots p)})$. In other words, a pseudo-random selection method of pseudo-values $(W_{ij}^k)$ is used with the aid of a random number generator (11) located on the centralised transmitting site (U), if not the designer site (U'). Any one of the following processes can be used:

"Pseudo-random" of an ergodic type.
"Weak disparity" (Sobol and Hamersley series, amongst others).
Any other method producing numbers asymptomatically shared out according to a specified distribution (for example, uniform on an interval).

Said "smp probabilistic series" $(W_{ij}^k)$ with a multi-value description of probable future pseudo-states or pseudo-variations is transmitted in a decentralised way from the transmitting site (U) towards all remote local systems $(S_u)$. This application method is recommended by the invention.

The second method suggested by the invention of repetitive stochastic simulation that prioritises through probable scenario sampling consists in its combined use with the method known as historical analysis. It is a simplified version of the Monte-Carlo method described above. According to this historical analysis method, the sampling of probable future variations of risk factors is transmitted directly from the memorised history. A history of values for p state variables $(X_i(t)^{(i=1 \cdots p)})$ of the common global environment (E) throughout time is maintained and updated at the centralised transmitting site (U). The "smp probabilistic series" $(W_{ij}^k)$ with a multi-value description of probable future pseudo-states or pseudo-variations of environment (E) is numerically generated and repetitively transmitted at successive instants $t_o$ by using the retained statistical model ($f_a(X_1, \ldots, X_p; t; \Delta t_k)$) of joint behaviour within the time (t) of state variables ($X_i$) and the memorised history of values for p state variables ($X_i(t)^{(i=1 \cdots p)}$). According to the method known as "historic", the estimate of probable future states of p state variables ($X_i(t)^{(i=1 \cdots p)}$) is recreated by using the standard status ($X_i(t_o)^{(i=1 \cdots p)}$) and past historic variations ($\Delta X_i(t')^{(i=1 \cdots p)}$) for a set of past dates ($t'<t_o$) and by affecting each recreated state with a production probability that could depend upon the age of the corresponding historic variation. Said "smp probabilistic series" ($W_{ij}^k$) with a multi-value description of probable future pseudo-states or pseudo-variations is transmitted in a decentralised way from the transmitting site (U) towards all remote local systems ($S_u$).

A third application variant of the invention consists in introducing biased data within the transmitted stochastic simulations. The aim of the biased data is take extreme situations into account that only rarely occur and/or constitute "catastrophe scenarios". According to this method, the generated "smp probabilistic series" ($W_{ij}^k$) with a multi-value description of probable future pseudo-states or pseudo-variations transmitted by the transmitting site (U) towards all remote local systems ($S_u$) is biased in relation to the statistics for the history of state variables or variable variations. According to this variant of the invention, a history of values for p state variables ($X_i(t)^{(i=1 \cdots p)}$) of the common global environment (E) throughout time is maintained and updated at the centralised transmitting site (U). The "smp probabilistic series" ($W_{ij}^k$) with a multi-value description of probable future pseudo-states or pseudo-variations of the environment (E) is numerically generated and repetitively transmitted at successive instants $t_o$ by using the retained statistical model ($f_a(X_1, \ldots, X_p; t; \Delta t_k)$) of joint behaviour within the time (t) of state variables ($X_i$) and the memorised history of values for p state variables ($X_i(t)^{(i=1 \cdots p)}$).

However, joint statistic behaviour biases of state variables ($X_i(t)^{(i=1 \cdots p)}$) in relation to their historic statistic behaviour are deliberately introduced into the "smp probabilistic series" ($W_{ij}^k$). The transmitted biased series thus reproduce "catastrophe scenarios". This enables the impact of said catastrophe scenarios on remote systems ($S_u$) to be taken into account. Said "smp probabilistic series" ($W_{ij}^k$) with a multi-value biased description of probable future pseudo-states or pseudo-variations is then transmitted in a decentralised way from the transmitting site (U) towards all remote local systems ($S_u$).

According to a first sub-variant of the third variant described above, the invention recommends that the grade of "smp probabilistic series" ($W_{ij}^k$) with a multi-value biased description of probable future pseudo-states or pseudo-variations transmitted by the transmitting site (U) towards all remote local systems ($S_u$) in relation to selective requests made from the different remote systems ($S_u$) be selectively adapted. To this end, certain remote systems ($S_u$) send requests as numerical parameters of catastrophe scenarios according to the specific biases as defined by them to the centralised transmitting site (U). In relation to these requests and by possibly merging those that are identical, "smp probabilistic series" ($W_{ij}^k$) with multi-value descriptions of probable future pseudo-states or pseudo-variations that are biased in relation to specified parameters requested by remote systems are generated at the centralised transmitting site (U). The transmitting site (U) selectively sends each remote local system ($S_u$) said "smp probabilistic series" ($W_{ij}^k$) with a multi-value biased description of probable future pseudo-states or pseudo-variations that corresponds to its request. This is sent electronically (via Internet, local network, telephone or any other method that allows the transmission of digital data).

According to a second sub-variant of the third variant described above, the invention recommends that remote systems ($S_u$) alter all or part of the "smp probabilistic series" ($W_{ij}^k$) they receive from the transmitting site (U) to take possible extreme situations that affect them into account. According to this sub-variant, certain remote systems ($S_u$) alter all or part of the "smp probabilistic series" ($W_{ij}^k$) with a multi-value description of probable future pseudo-states or pseudo-variations. This enables biased series to be created locally by reproducing catastrophe scenarios whose parameters are either specified by the main transmitting site (U) and transmitted to local systems ($S_u$) or defined by the local systems ($S_u$).

A fourth preferred application variant of the invention consists in numerically transmitting the "smp probabilistic series" ($W_{ij}^k$) with a multi-value description of probable future pseudo-states or pseudo-variations from the transmitting site (U) periodically and according to a sampling frequency ($\phi$).

According to a fifth application variant, the invention recommends three methods to transmit the "smp probabilistic series" ($W_{ij}^k$) with a multi-value description of probable future pseudo-states or pseudo-variations from the transmitting site (U) towards all remote local industrial systems ($S_u^{(u=1 \cdots n)}$).

A first sub-variant for the emission of probabilistic data is described in FIG. 6. At the centralised transmitting site (U), said "smp probabilistic series" ($W_{ij}^k$) with a multi-value description of probable future pseudo-states or pseudo-variations is transmitted in a decentralised way from the transmitting site (U) towards all remote local systems ($S_u$) as a "broadcast", notably by radio. Independently, each local system ($S_u$), the majority of which are quite a distance away from the centralised transmitting site (U), repetitively gathers said "smp probabilistic series" ($W_{ij}^k$) with a multi-value description of probable future pseudo-states or pseudo-variations and s×m×p numerical values ($W_{ij}^k = X_{ij}^k$ or $\Delta X_{ij}^k$) through a quasi-continuous reception of this "broadcast" from the centralised transmitting site (U).

A second sub-variant of the emission of probabilistic data is described in FIG. 7. At the centralised transmitting site (U), said "smp probabilistic series" ($W_{ij}^k$) with a multi-value description of probable future pseudo-states or pseudo-variations is transmitted in a decentralised way from the transmitting site (U) towards all remote local systems ($S_u$) as a "below PP", i.e. emission on a network (R), notably Internet based, from the centralised transmitting site (U) to specific addresses for each remote local industrial system ($S_u^{(u=1 \cdots n)}$). To this end, it is noted that the transmitting site (U) is equipped with a main modem (20) and each remote local industrial system ($S_u^{(u=1 \cdots n)}$) with a local modem (21) through which probabilistic data passes. Independently, each local system ($S_u$), the majority of which are quite a distance from the centralised transmitting site (U), repetitively gathers said "smp probabilistic series" ($W_{ij}^k$) with a multi-value description of probable future pseudo-states or pseudo-variations and s×m×p numerical values ($W_{ij}^k = X_{ij}^k$ or $\Delta X_{ij}^k$) through successive registrations at the local memory bank ($H_u$) of the local calculator ($C_u$).

A third sub-variant of the emission of probabilistic data is described in FIG. 8. At the centralised transmitting site (U), said "smp probabilistic series" ($W_{ij}^k$) with a multi-value description of probable future pseudo-states or pseudo-variations is transmitted in a decentralised way from the transmitting site (U) towards all remote local systems ($S_u$) by making said multi-valued "smp probabilistic series" ($W_{ij}^k$) available on a probabilistic data server (Z). The latter is available on an emission network (R) (notably Internet type) through "PP" access of each remote local industrial system ($S_u^{(u=1\cdots n)}$). Independently, each local system ($S_u$) repetitively gathers said "smp probabilistic series" ($W_{ij}^k$) with a multi-value description of probable future pseudo-states or pseudo-variations through access known as "above PP". In other words, each system accesses server (Z) of the centralised transmitting site (U) via network (R) through requests made to their specific address (notably Internet type). Subsequently, they receive the "smp probabilistic series" by transfer (notably "FTP" type) via network (R) and via registration at the local memory bank ($H_u$) of their local calculator ($C_u$).

According to a sixth application variant, the invention recommends three methods to organise "smp probabilistic series" ($W_{ij}^k$) transmitted from the centralised transmitting site (U) towards all remote local industrial systems ($S_u^{(u=1\cdots n)}$) in order to compress transmitted probabilistic data and to accelerate access by all remote local industrial systems ($S_u^{(u=1\cdots n)}$).

According to a first sub-variant for organising the emission of probabilistic data, an "smp probabilistic series" ($W_{ij}^k$) with its multi-value description of probable future pseudo-states or pseudo-variations of the environment (E) is numerically generated and repetitively transmitted at successive instants ($t_o$) from the centralised transmitting site using the retained joint behaviour statistical model ($f_a(X_1,\ldots,X_p;t;\Delta t)$) in time (t) of state variables ($X_i^{(i=1\cdots p)}$). This series consists of s (where s is much greater than >> 1) numerical pseudo-values for p components ($W_{ij}(t_k)^{(i=1\cdots p, j=1\cdots s)}$) for each m (m≧1) time forecast ($t_k^{(k=1\cdots m)}$) as an "smp file" of s×m×p successive alpha-numerical data. However, on the one hand, this "smp file" is sub-divided into successive m "temporal sub-files" of level 1 that groups together all pseudo-values of a same time forecast ($t_k^{(k=1\cdots m)}$). On the other hand, each "temporal sub-file" consists of a succession of s "selection sub-files" of level 2 each made up of a pseudo-value p-uplet.

According to a second sub-variant for organising the emission of probabilistic data, an "smp probabilistic series" ($W_{ij}^k$) with its multi-value description of probable future pseudo-states or pseudo-variations of the environment (E) is numerically and repetitively generated at successive instants ($t_o$) from the centralised transmitting site (U) by separating successive m "temporal sub-files" of level 1 and gathering together all pseudo-values of a same time forecast ($t_k^{(k=1\cdots m)}$) with a corresponding time forecast indicator ($\eta_k^{k=1\cdots m}$). At each local system ($S_u$), different said temporal sub-files of a same "smp probabilistic series" ($W_{ij}^k$) with its multi-value and collected data are separated from one another by identifying their specific time forecast indicators ($\eta_k^{k=1\cdots m}$).

According to a third sub-variant for organising the emission of probabilistic data, an "smp probabilistic series" ($W_{ij}^k$) with its multi-value description of probable future pseudo-states or pseudo-variations of the environment (E) is numerically and repetitively generated at successive instance ($t_o$) from the centralised transmitting site (U) by separating successive s "selection sub-files" of level 2 (from a same temporal file) and each gathering together a pseudo-value p-uplet with a corresponding selection indicator ($\tau_j^{(j=1\cdots s)}$). At each local system ($S_u$), different successive "selection sub-files" of level 2 (from a same temporal file) each gathering a pseudo-value p-uplet from a same "smp probabilistic series" ($W_{ij}^k$) with its multi-value and collected data are separated ones from the other by identifying their specific selection indicator ($\tau_j^{(j=1\cdots s)}$).

According to a seventh application variant, the invention recommends three method to selectively filter the content of the "smp probabilistic series" ($W_{ij}^k$) transmitted by the centralised transmitting site (U) towards all remote local industrial systems ($S_u^{(u=1\cdots n)}$). It aims to adapt their content to the needs and features of the remote local industrial systems ($S_u^{(u=1\cdots n)}$) as well as to the hierarchical, industrial or commercial ties between the centralised transmitting site (U) and all remote local industrial systems ($S_u^{(u=1\cdots n)}$).

A first sub-variant for filtering the emission of probabilistic data is described in FIG. 6. At the centralised transmitting site (U), said "smp probabilistic series" ($W_{ij}^k$) with its multi-value data is transmitted in its entirety in a decentralised way by the transmitting site (U) towards all remote local systems ($S_u$) as a "broadcast". Radio transmission is another process that can be used and is accessible to all local systems ($S_u$). Independently, a selective filter that is pre-adjusted (22) for availability at a predefined fraction ($W'^k_{ij}$) of said collected "smp probabilistic series" ($W_{ij}^k$) from the centralised transmitting site (U) is installed and used at each local system ($S_u$). The data filtering characteristics of this selective filter may be acquired, in particular, through a specific subscription taken out by each local system ($S_u$) for the transmitting site (U). They may be altered by remote action through the network linking the centralised transmitting site (U) up to the level systems ($S_u$).

A second sub-variant for filtering the emission of probabilistic data is described in FIG. 7. At the centralised transmitting site (U), various different predefined fractions (($W_{ij}^k)_g^{(g=1\cdots v)}$) (notably acquired through specific subscription) of said "smp probabilistic series" ($W_{ij}^k$) are selectively transmitted (according to a predefined allocation rule). This selective transmission is performed in a decentralised way by the transmitting site (U) towards various groups ($G_g^{g=1\cdots v}$) that are linked to all remote local systems ($S_u$). Each group receives a particular fraction. This is done through a "below PP" emission, i.e. via a network (R), notably Internet based, from the centralised transmitting site (U) to the specific address for each remote local industrial system ($S_u^{(u=1\cdots n)}$). Independently, each group ($G_g^{g=1\cdots v}$) linked to the local systems ($S_u$) repetitively gathers said predefined fraction (($W_{ij}^k)_g$) of the "smp probabilistic series" ($W_{ij}^k$). They successively register this predefined fraction (($W_{ij}^k)_g$) into the local memory bank ($H_u$) of their local calculator ($C_u$).

A third sub-variant for filtering the emission of probabilistic data is described in FIG. 8. At the centralised transmitting site (U), said "smp probabilistic series" ($W_{ij}^k$) is transmitted in a decentralised way from the transmitting site (U) towards all remote local systems ($S_u$) by making said "smp probabilistic series" ($W_{ij}^k$) available on a server (Z) operated by a network (R) (notably Internet type) to which each remote local industrial system ($S_u^{(u=1\cdots n)}$) may access as "above PP". However, various predefined restrictive fractions (($W_{ij}^k)_g$) (notably acquired through specific subscription) of said "smp probabilistic series" ($W_{ij}^k$) are selectively made available to different local system ($S_u$) groups ($G_g^{g=1\cdots v}$) on a server (Z). This may in particular be operated through means of user names and passwords (23) that are transmitted by each local system ($S_u$) while accessing server (Z). Independently, each local system ($S_u$) repetitively gathers said predefined fraction (($W_{ij}^k)_g$) attributed to said "smp probabilistic series" ($W_{ij}^k$) through access known as "below PP", i.e. via a network (R) from the centralised transmitting site (U) to its specific address. They receive said predefined fraction (($W_{ij}^k)_g$) attributed to the multi-value "smp probabilistic series" by transfer. They successively register this predefined fraction $((W_{ij}^k)_g)$ into the local memory bank $(H_u)$ of their local calculator $(C_u)$.

According to an eighth application variant described in FIG. 10, the invention recommends to carry out a grouped probabilistic optimisation of certain groups of remote local industrial systems $(S_u^{(u=1 \cdots n)})$. This relates, in particular, to cases where industrial systems of a same optimisation group share industrial targets (of production, savings and so forth) that are worth optimising globally. First, n' (n'≦n) local industrial systems retained from amongst the n of said local industrial systems $(S_u)$ are chosen. Also previously chosen are m' (m'≦m) time forecasts are retained from amongst the m of said time forecasts $(t_k^{(k=1 \cdots m)})$ that are identical for all local systems.

At each n' of retained local systems $(S_u)$ and for each m' of retained time forecast $(t_k)$, the local systems analysis model $(D_u)$ is numerically applied having been previously set in order to determine the productivity indicator level $(I_{uj}^k = D_u(\lambda_u, (X_{i,j}(t_k)))$ within each s scenario (j=1, ... ,s):

For at least a particular value $(\lambda_u)$ of the local action parameters vector.

For each simulated s p-uplet state variable $(X_i(t_k)^{(i=1 \cdots p)})$ that corresponds to the said retained time forecast $(t_k)$ of the probabilistic series of pseudo-states $(X_j(t_k)^{(j=1 \cdots s)} = (X_{ij}(t_k)^{(i=1 \cdots p, j=1 \cdots s)})$.

The simulated s pseudo-values corresponding to the productivity indicator $(I_{uj}(t_k, \lambda_u)) = (D_u(\lambda_u, X_j(t_k))^{(j=1 \cdots s)})$ are determined. The "local simulation series" consisting of s simulated pseudo-values corresponding to the productivity indicator $(I_{uj}(t_k, \lambda_u)) = (D_u(\lambda_u, X_j(t_k))^{(j=1 \cdots s)})$ of the local system $(S_u)$ is transmitted in a centralising way towards a centralising site (B).

At the centralising site (B), the simulating sxn' pseudo-values of the productivity indicators $(I_u(t_k, \lambda_u))^{(j=1 \cdots s)}$ are collected from each n' local system $(S_u)$ and for each s simulation, and the global productivity indicator $(J_j)$ of all local systems is calculated for each simulation by using a global assessment model $(J_j) = (\chi(I_{uj}(t_k, \lambda_u)^{(u=1 \cdots n', j=1 \cdots s)})$. The corresponding s values of the productivity indicator $(J_j(t_k; \lambda_1, \ldots, \lambda_{n'})^{(j=1 \cdots s)})$ are grouped together and arranged according to their level. The histogram (Γ) is calculated and stored as is the probability (as a number or percentage) distribution (Ψ(J)) of the level reached by the global productivity indicator (J) in the configuration of local action parameters vector $(\Lambda) = (\lambda_u^{(u=1 \cdots n')})$ chosen according to the retained local models $(D_u)$ and the global assessment model (χ). A statistical calculation deduces the value of at least one chosen statistical parameter of adjustment (V(Λ)) (such as average, spread type, Value at Risk, utility and so forth) that is characteristic of the probability distribution $(\chi(\lambda_1, \ldots, \lambda_{n'}, J))$ for global productivity levels $(J_j(t_k; \lambda_1, \ldots, \lambda_{n'}))$ in relation to the multi-vector values (□)=(□1, ... ,□n) of the vectors of local action parameters (□u).

If necessary, a global numerical optimisation (according to predetermined criteria) of the chosen statistical parameters of adjustment (V(□)) is performed in relation to the multi-vector (□)=(□1, ... ,□n). The corresponding level of its vector optimised from the local action parameters $(\lambda_u)$ is transmitted to each local system $(S_u)$ in order to globally anticipate the future probable behaviour and effectiveness of all local system $(S_u)$ subjected to the environment (E) during any one retained time forecast $(t_k)$.

According to the invention, FIG. 9 describes an application process in the financial industry. The invention process carries out a repetitive stochastic simulation through the sampling of probable future pseudo-states of market variables, for the probabilistic predication of future behaviour and/or the optimisation of productivity parameters of a number n (where n is much greater than >> 1) of local financial operators $(S_u^{(u=1 \cdots n)})$. The invention relates to the case where local financial operators $(S_u^{(u=1 \cdots n)})$ are decentralised and quite a distance from one another. Each local financial operator $(S_u^{(u=1 \cdots n)})$ has a portfolio $(P_u^{(u=1 \cdots n)})$ consisting of financial assets $(\theta_h^{(h=1 \cdots q)})$ whose value $(I_u^{(u=1 \cdots n)})$ depends upon capital market (E) fluctuations. The portfolio $(P_u^{(u=1 \cdots n)})$ value $(I_u^{(u=1 \cdots n)})$ may be calculated in combination with a market variables vector $(X(t)) = X_i(t)^{(i=1 \cdots p)}$ and for each remote local financial operator $(S_u)$, with a quantities vector $(\lambda_u) = (\lambda_{uh}^{(h=1 \cdots q)})$ of each financial asset $(\theta_h^{(h=1 \cdots q)})$ held in its portfolio $(P_u)$. Market variables $(X_i(t)^{(i=1 \cdots p)})$ are common to the different local financial operators $(S_u^{(u=1 \cdots n)})$ and vary throughout time (t). It is possible for each remote local financial operator $(S_u)$ to recreate, with acceptable precision, the value of all financial assets held in its portfolio $(P_u)$ according to a local assessment model $(D_u)$ by using the market variables vector $(X(t)) = X_i(t)^{(i=1 \cdots p)}$. Market variables may include assets or commodities prices, interest rates or coefficients of yield curbs, volatilities or coefficients of volatility surfaces, default indicators from an issuer or counter-party, or even any other number that can provide information pertaining to the state of capital markets.

For example, the value $(I_u^{(u=1 \cdots n)})$ of a portfolio $(P_u^{(u=1 \cdots n)})$ may be calculated according to the following linear combination:

$$I_u(t) = \sum_{h=1}^{q} \lambda_{uh} \pi_h(t, X(t)\theta_h) (***)$$

where $\lambda_h(t, X(t), \theta_h)$ is the asset price $(\theta_h)$ art instant (t) according to the local model $(D_u)$ when the market is in state (X(t)), or by using any other formula that allows for a non-linearity in relation to quantities $(\lambda_{uh})$ particularly in order to take liquidity risk into account.

According to a first sub-variant of the invention's process of application to the financial industry, the following prior choices are made at the expert site (U'):

p market variables $(X_i(t)^{(i=1 \cdots p)})$ that describe the entire market.

A statistical model of joint behaviour in time (t) and by time periods $(\Delta t_k^{k=1 \cdots m})$ of market variables $(X_i(t)^{(i=1 \cdots p)})$ that is described by its dense joint distribution $(f_a(X_1, \ldots, X_p; t; \Delta t_k))$.

The statistic model of joint behaviour in time (t) and by time periods $(\Delta t_k^{k=1 \cdots m})$ of market variables is determined from historical observations that may include, in particular, normal laws, normal logs and so on, or more generally, a joint statistic distribution of p environment variables $(X_i t(k)^{(i=1 \cdots p)})$ or their temporal variations $(\Delta X_i(t_k)^{i=1 \cdots p})$. It is assessed through appropriate and classical statistic tests (averages, variances, correlations, breaks, extreme behaviours and so forth).

At the centralised transmitting site (U), and by using the statistical model $(f_a(X_1, \ldots, X_p; t; \Delta t_k))$ retained from joint distribution within the time (t) of market variables $(X_i^{(i=1 \cdots p)})$, an "smp probabilistic series" $(W_{ij}^k)$ with a multi-value description of pseudo-states or pseudo-variations for the probable market future (E) is numerically generated at repetitive and successive instants $(t_o)$.

According to a first application mode, this "smp probabilistic series" ($W_{ij}^k$) is an "smp probabilistic series" ($X_{ij}^k$) of pseudo-states formed by s×m p-uplets of a multi-value sampling for future pseudo-states ($X_{ij}(t_k)^{(i=1\ldots p, j=1\ldots s, k=1\ldots m)}$) that include possible s×m×p numerical values of p market variables ($X_i(t)^{(i=1\ldots p)}$) and constitute:

For each m (m≧1) time forecast ($t_k^{(k=1\ldots m)}$) of the simulation.

Of s (where s is much greater than >> 1) possible future pseudo-states of p market variables ($X_i(t_k)^{(i=1\ldots p)}$).

According to a second application mode, this "smp probabilistic series" ($W_{ij}^k$) is an "smp variational probabilistic series" ($\Delta X_{ij}^k$) formed by s×m p-uplets of a multi-value sampling for future pseudo-variations ($\Delta X_{ij}(t_k)^{(i=1\ldots p, j=1\ldots s, k=1\ldots m)}$) from the standard state of market variables ($X_i(t_o)^{(i=1\ldots p)}$) that include s×m×p numerical values of probable future pseudo-variations for p state variables ($X_i(t_k)^{(i=1\ldots p)}$) and constitutes:

For each m (m≧1) time forecast ($t_k^{(k=1\ldots m)}$) of the simulation.

Of s (where s is much greater than >> 1) possible numerical pseudo-variations for p state variables ($X_i(t_k)^{(i=1\ldots p)}$).

Thus, the process of the invention, at the centralised transmitting site (U) that is quite a distance from the majority of n local financial operators ($S_u^{(u=1\ldots n)}$), is to transmit at repetitive and successive instants ($t_o$) said "smp probabilistic series" ($W_{ij}^k$) with a multi-value description of probable future pseudo-states or pseudo-variations that includes s×m×p numerical pseudo-values and consists of:

(Case 1) said "smp probabilistic series" ($X_{ij}^k$) of pseudo-values for market variables ($X_{ij}(t_k)^{(i=1\ldots p, j=1\ldots s, k=1\ldots m)}$).

(Case 2) and/or said "smp variational probabilistic series" ($\Delta X_{ij}^k$) for future pseudo-variations ($\Delta X_{ij}(t_k)^{(i=1\ldots p, j=1\ldots s, k=1\ldots m)}$).

This transmission of said "smp probabilistic series" ($W_{ij}^k$) is performed in a decentralised way from the transmitting site (U) towards all remote local operators ($S_u$).

Independently, and from each of the local operators ($S_u$), the majority of which are quite a distance from the centralised transmitting site (U), m' (m'≦m) time forecasts retained from amongst the m said time forecasts ($t_k^{(k=1\ldots m)}$) are chosen. If necessary, as in case 2 in which only said "smp variational probabilistic series" ($\Delta X_{ij}^k$) of variational sampling is received, said corresponding "smp probabilistic series" ($X_{ij}^k$) of pseudo-states" consisting of pseudo-samplings of future states ($X_{ij}(t_k)^{(i=1\ldots p, j=1\ldots s, k=1\ldots m)}$) (at least for the retained m' time forecasts ($t_k$)) is locally calculated. Subsequently, for each retained m' time forecasts ($t_k$), the global value ($I_{uj}^k = D_u(\lambda_u, (X_{ij}(t_k))$) of the portfolio ($P_u$) is numerically calculated according to a local assessment model ($D_u$) that has been previously set within each s scenarios (j=1, . . . ,s). The calculation is done for at least one particular value of the quantities vector ($\lambda_u) = (\lambda_{u1}, \ldots, \lambda_{uq}$) of held assets and for each simulated s p-uplets of state variables ($X_{ij}(t_k)$) that corresponds to said retained time forecast ($t_k$) for the probabilistic pseudo-state series ($X_{ij}(t_k)^{(j=1\ldots s)}$). The corresponding simulated s pseudo-values of the portfolio ($I_{uj}(t_k,\lambda_u)) = D_u(\lambda_u, (X_{ij}(t_k))^{(i=1\ldots p, j=1\ldots s)}$) are then determined. These s portfolio ($P_u$) values are grouped together and arranged. The histogram ($\Gamma_u$) is then calculated and stored as is the probability (as a number or percentage) distribution ($\Psi_u(I_u)$) of the local portfolio ($P_u$) value ($I_u$) in the configuration ($\lambda_u$) according to the local model ($D_u$). A statistical calculation deduces the value of at least one chosen statistical parameter of adjustment ($V(\lambda_u)$) (such as average, spread type, Value at Risk, utility and so forth) that is characteristic of the probability distribution ($\Psi(\lambda_u,I)$) for values ($I_u(t_k,\lambda_u)$ in relation to vector variations ($\lambda_u) = (\lambda_{u1}, \ldots, \lambda_{uq}$) describing the portfolio ($P_u$).

If necessary, a numerical optimisation (according to predetermined criteria) of one or many chosen statistical parameters of adjustment ($V(\lambda_u)$) is performed locally within each local operator ($S_u$). The portfolio composition ($\lambda_u) = (\lambda_{u1}, \ldots, \lambda_{uq}$) of each local operator ($S_u$) is then adjusted to a calculated optimal value in relation to predetermined criteria notably in order to anticipate the future probable behaviour and yield of each portfolio ($P_u$) subjected to the market (E) during any one retained time forecast ($t_k$).

According to a second sub-variant of the invention's process of application to the financial industry, the value ($I_{uj}^k$) of a financial operator's ($S_u$) portfolio ($P_u$) at a future date ($t_k$) according to the model ($D_u$) and within the state of the simulated market ($X_j(t_k)$) that corresponds to scenario j is assessed by taking the simulated market states in the same scenario j at subsequent dates ($t_l^{(l=k+1\ldots m)}$) into account in the model ($D_u$) according to the following principles:

Each financial asset ($\theta_h^{(h=1\ldots q)}$) has a defined maximum quantity ($v_h$) with which it is able to trade (to buy or to sell) within a day.

If none of the asset ($\theta_h$) quantities ($\lambda_{uh}$) held in the portfolios ($P_u$) exceeds the limit value ($v_h$), then formula (***) with date and within simulation is used to assess portfolio value:

$$I_{u,j}^k = \sum_{h=1}^{q} \lambda_{uh} \pi_h(t_k, X_j(t_k), \theta_h)$$

If one of the asset ($\theta_h$) quantities ($\lambda_{uh}$) held in one of the portfolios ($P_u$) exceeds the limit value ($v_h$) in absolute terms, then the quantity ($\lambda_{uh}$) is replaced by ($v_h$) affected by its sign and with date, and the overhang ($\lambda_{uh} \pm v_h$) is reported for the following day ($t_{k+1}$) by using the market variables vector ($X_j(t_{k+1})$).

If this quantity is still above the limit ($v_h$) in absolute value, it is then set to the maximum value with the same sign, and the overhang ($\lambda_{uh} \pm 2v_h$) is again reported for the following day ($t_{k+2}$) by using the market variables vector ($X_j(t_{k+2})$), and so forth.

This particular arrangement allows the liquidity risk to be taken into account by imposing upper bound constraints to the quantity of each asset ($\theta_h$) that can be rightly assessed according to the local model ($D_u$) at any given date ($t_k$), and thus leading to a possible report of the resulting virtual position within each simulation over subsequent dates.

INDUSTRIAL APPLICATIONS OF THE INVENTION

The invention has an industrial application in all fields, such as manufacturing, energy, food, finance, transport, public health, use of raw materials and any other industries that are subjected to a common global environment and where it is suitable to measure and/or control the impact of possible changes in global and local environment variables on the production of a number of remote industrial sites.

By way of example, the lessons of the invention may be favourably used to optimise the watering of crops, calculate road travel time or manage a fleet of cars.

Thus, a first application of the invention relates to agriculture. For this application, the remote local industrial systems ($S_u^{(u=1\ldots n)}$) are the farms of different plots of cultivated land. State variables ($X_i(t)^{(i=1\ldots p)}$) of the environment are air temperature, pluviometry, hygrometry, dryness of land and others at different geographical points. The local action parameters $(\lambda_u)=(\lambda_{u1},\ldots,\lambda_{uq})$ are mainly the characteristics of plots and plantations. The aim of the invention is to limit over-consumption of water by automatically activating different watering systems only when the probability of arable lands suffering from dryness within the coming hours or days is above the acceptance threshold as defined by the farmer of each plot of land. Thus, the automatic watering systems are not activated if the probability of rain in the coming hours is high. Conversely, they could be activated one evening, for example, if the probability of extreme dryness the following day is high. Mutual cooperation between those that generate the sampling of meteorological variables and therefore, the expenses of the centralised probabilistic transmitting site (U) means that the setting-up of this automatic watering activation system is less costly.

A second application of the invention relates to optimising road travel. The target is to estimate the probability law on time taken for a driver or a haulage contractor to reach their destination given all external random factors. For a driver needing to reach a point at a specific time, the optimisation of complex probabilistic criteria (probability of reaching a set point at a given time) is the only aspect which will allow them to truly optimise their chosen itinerary. Statistically, there could indeed be a section of the road where traffic generally moves freely, yet when it slow downs, the road may be jammed for a long time, and the view of the average (expected) travel time is therefore too simplistic. According to the invention, each vehicle of a road network consists of a remote local industrial system $(S_u)$. The vehicles are subjected to random factors $(X_i(t)^{(i=1\cdots p)})$ which include, for example, traffic fluidity on different sections of the road, the meteorologic situation, an unexpected breakdown or accident and so forth. The local action parameters $(\lambda_u)=(\lambda_{u1},\ldots,\lambda_{uq})$ of each vehicle represent the situation of the road network, planned route, speed of vehicle, type of vehicle and driving, and so forth. At the different remote industrial systems, the interface $(\Omega)$ for capturing parameters $(\lambda_{u1},\ldots,\lambda_{uq})$ may be linked up to different control systems in the vehicle (notably a satellite navigation system, such as GPS, and vehicle captors) and a probabilistic data receiver $(Rp_u)$ may be connected to a loaded Internet terminal.

A variation to this second application relates to managing a fleet of vehicles (public transport, freight transport, car hire amongst others). If each vehicle or rolling system is fitted with a localisation system (of GPS type for example) and a transmitter, then it is possible to know the distribution of the fleet at a past or present instant. It is also possible to know "the most probable situation" (expectation) of vehicle location at any given future date. By centralising the simulated pseudo-values of the productivity indicators $(I_{uj}(t_k,\lambda_u))$ at a centralising site (E), the invention allows the manager of vehicle numbers to hone his vision on the probability of coming events. Thus, the manager of vehicle numbers may automatically control the probability of unexpected events that are rare yet laden with consequences (probability that all trucks of a freight haulage contractor simultaneously break down or probability that all vehicles of a car hire service are concentrated in one area).

A third particularly favourable application of the invention relates to the management of parameters for industrial units working on a same network and subjected to a common global random environment. By way of example, the lessons of the invention may be favourably applied to the field of electricity production within a deregulated environment where the price of electricity is set by comparing offer of n producers $(S_u^{(u=1\cdots n)})$ and demand by a high number of consumers on a central market (the "energy pool"). The meeting of offer and demand may be done on the basis of a main planning centre that provides each producer with its working parameters. Such an approach poses the following two problems:

The main planning centre must consider a significant amount of information, namely common information (level of demand, state of the network, prices of raw energy), local information strongly interacting with the global environment (weather) and multiple information that is specific to each producer and separate from the global environment (functioning and performance of a particular turbine, problems of discharge limits that pollute a particular river, and so on). According to classical methods, this optimisation problem has no solution under these conditions, except to grossly simplistic hypotheses of local constraints.

Each local producer must strive to answer to requests by the main planning centre. In disregarding, by definition, the behaviour of a central optimisation model, the producer will be confronted with administrative uncertainties (which request will the main planning centre focus on?) in addition to a random global environment. This administrative uncertainty is just as difficult to model as it only imperfectly takes local operating constraints into account. The operating risk therefore becomes even more difficult to manage. Under these conditions, the global optimal value according to classical methods is illusory as it relies upon a series of remote operating states that are far from the real optimal value.

This approach, which is predominantly used in the field of electricity production, was analysed by the applicants. This study found that, in practice, the approach led to significant industrial and energy overcapacities.

The classical alternative to relocate the optimisation problem is to establish a market where offer and demand can meet with a balanced price. The economic theory shows that searching for local optimal values relates to a global optimal value under certain very general hypotheses of convexity. The problem is technically laborious for electricity since storage is impossible. Thus, there are just as many markets as there periods during the year. The recent general move towards deregulating electricity markets has currently led to several market organisation models that it would be too long-winded to list them here. However, they more or less meet along the same lines as the model described below.

The "energy pool" is segmented into (m) sub-markets that correspond to separate time forecasts $(\Delta t_k^{(k=1\cdots m)})$ with a "notice period". By way of example, we distinguish a very short-term market of a few minutes intended to maintain tension on the network, a short-term market of 1 hour, namely a "balancing market", intended to compensate for offer and demand uncertainties, a "normal" market of 24 hours and so on. For every sub-market, each producer $(S_u^{(u=1\cdots n)})$ (power station) must be committed to respect a production cost curb $(C_{ku}(w))$ that provides production costs for cost capacity level (w) offered on the network (this cost may be infinite beyond a maximum capacity level). For every sub-market, the "energy pool" classifies the capacity offers according to increasing cost and matches them up with demand on the particular sub-market. where the price $(P_k^{(k=1\cdots m)})$ of a kilowatt/hour on the sub-market is a result of this match. Producers with production costs above the price $(P_k)$ are not called upon by the network manger. If a producer, following accidental unavailability, notices during the time $(\Delta t_k)$ before delivery that it is unable to respect its commitment on the sub-market (l) (with $\Delta t_k < \Delta t_l$) then it must buy back the corresponding quantities on the sub-market (k) (or any other sub-market wth a shorter notice period). within this application framework of the invention, the producer's productivity indicator is its gross margin. A producer's ($S_u^{(u=1\cdots n)}$) order parameters ($\lambda_u = (\lambda_{u1}, \ldots, \lambda_{uq})$) are specifically the following:

- Allocation of its available capacity ($Cap_u$) between (m) sub-markets and a specific sub-market that is programmed to be maintained by the power station.
- Choice of primary energy use if this resource is available (for example, gas/carbon, fuel/carbon).

The choice of parameters is subjected to local operating constraints such as time and minimum start-up costs for a unit, change of fuel type, minima and maxima techniques, problems of discharge limits that pollute air and water, and so forth. The local optimisation problem is complex, insofar as its calls upon a forecast based on random variables that are relevant to both an environment specific to the installation (availability of production installations) and a global environment common to all producers, including the following:

- Weather, and, in particular, temperature for a thermal power station (that affects thermodynamic productivity of power station) pluviometry for a hydraulic power station (that affects output and reserves) and so on.
- Prices of (m) electricity sub-markets.
- Prices of fuel used by a producer and so on.

This global environment is very familiar to all producers where prices are the same for everyone and climatic variables not only strongly correlate between different sites but also interact with price booms (for example, we expect a very cold day predicted within 24 hours would reflect a surge in electricity prices on the market within 24 hours).

The global optimisation problem by a main planning system is replaced by n local optimisation problems, in order to maximise the expected gross margin for example and to guarantee a minimal gross margin of x% to bear the debt charge (typically, a Value-at-Risk calculation), thereby entailing complex calculations. According to the previous work, the three possible solutions are as follows:

- Following trading, each producer enters into agreement with a body, such as an "asset manager", equipped with global environment analysis tools that will dictate parameter choices in exchange for guaranteeing a predetermined gross margin ("tolling agreement"). This solution eliminates, through trading, a possible inefficient main planning system, albeit fundamentally posing the same type of problem in that such agreements may never perfectly take local operating constraints into account. Further, it entails relaying confidential information about the site's functioning constraints to the "asset manager".
- Each producer carries out its optimisation on the basis of an analytical modelling of the global environment and its impact on their productivity equation. This is done after very simplistic hypotheses that, when not respected, lead to crisis situations (extremely high losses for the producer, global production deficit, and so on).
- Each producer simulates all possible environment states (global and specific to each time forecast) that correspond to electricity sub-markets. It calculates its gross margin for each state and parameter trajectory, and chooses the parameters vector thereby optimising the "expectation/VaR" pair on its gross margin. The simulation of possible global environment states entails the application of complex calculations, thereby requiring costly computing systems and resources, obviously identical for all producers.

The application of the invention's lessons allows each electricity producer to choose the third approach, i.e. the only one that allows an exact search for a local optimal value all the while mutualising the complex side of calculations. According to the invention:

- It repetitively gathers (with a frequency that corresponds to the price quotation frequency on the pool) said "smp probabilistic series" ($W_{ij}^k$) with a multi-value description of probable future pseudo-states at s×m×p numerical values ($W_{ij}^k = X_{ij}^k$ global) that is provided by the centralised transmitting site (U).
- For each "smp probabilistic series" and for each possible orders parameter vector, it selects a default random function that reflects the probability of a technical fault in the installation. It then deduces a gross margin ($MB_u(W_{ij}^k, \lambda_u)$) for each state and orders parameter vector that is calculated using a simple arithmetic calculation.
- Subsequently, a simple sorting action that classifies gross margin ($MB_u$) selections for each vector ($\lambda_u$) is deduced for a function $VaR_u(\lambda_u)$ and an expected gross margin function $Emb_u(\lambda_u)$.

The complex optimisation problem in a random environment is reduced to a simple optimisation problem that is to seek the maximum of $Emb_u(\lambda_u)$ under the constraint $VaR_u(\lambda_u) < V_{max}$ for each power station ($S_u^{(u=1\cdots n)}$).

ADVANTAGES OF THE INVENTION

The invention allows for computing systems and human resources necessary for the application of probabilistic simulations on a set of remote industrial sites that are subjected to a common random environment to be minimised with the notable end results being:

- To optimise production while respecting regulation constraints.
- To optimise production costs by controlling unfavourable unexpected events.
- To control and minimse rare and unfavourable unexpected events.

Another advantage of the invention is to simplify the global risk calculation of a group of remote local industrial systems.

A third advantage of the invention is to perform local statistical simulation calculations at a number of industrial sites by using mutualised random selections without any local system having to transmit information to the centralised transmitting site on its situation or having to adjust its industrial parameters. This ensures an improved industrial and commercial confidentiality.

In addition, the application example in the electric energy field given above allows the following advantages for an industrial producer to be outlined:

- The producer may draw nearer to the local optimal value by using the most sophisticated optimisation techniques in a simple way and with few local resources. This will reflect a faster turnover on investment or a price drop for the benefit of consumers.
- There is no need to invest in expensive modelling and global environment simulation systems. The producer may focus on the simulation of specific local parameters that are separate from the global environment.
- There is no need for the producer to relay its working parameters to a central body. Within a competitive environment, the consumer may therefore preserver its strategic confidentiality.

The applicants reserve themselves the sole right to the invention, its description and relevance now justified through detailed examples, throughout the duration of the patent, with no limitation other than that contained in the terms of the claims hereinafter.

The invention claimed is:

1. A method of simulating a local system which is in interaction with other local systems within a global environment, wherein:

said global environment has a global state that is represented by a global set of quantifiable entities, the interaction of a local system with said global environment is represented at a given time by a local set of parameters, and each local system has a predetermined local function to calculate a local indicator of performance, said predetermined local function using values of said global set of quantifiable entities and said local set of parameters, said method comprising the steps of:

a) generating, at a central location separate from the local systems, a collection of global sets of values, each of said global sets of values representing a possible future global state of said global environment at a future time, and said collection representing a variety of possible future global states, b) transmitting the collection of global sets of values to the local systems, c) at one or more of the local systems, c1) receiving at least some of said collection of global sets of values, c2) selecting a first local set of parameters, c3) calculating a first value of the local indicator of performance, with said predetermined local function using a first global set of values in said collection thereof as received, and using said selected first local set of parameters, c4) selectively repeating step c3) while changing the global set of values within said collection thereof as received, until covering at least a portion of said collection, thereby obtaining a collection of values of the local indicator of performance, and d) at the local systems, using said collection of values of the local indicator of performance as a predictive simulation of the local system, for said selected first local set of parameters thereof; and e) based on the predictive simulation performed for each of the local systems, controlling one or more of the local systems to operate within predetermined constraints, wherein steps c2) to c4) are selectively repeated for different sets of local parameters, wherein step d) is followed by the following steps:

at one or more of the local systems, retransmitting the local indicator of performance back to a remote location that is common to a subset of local systems, at said remote location, i) receiving a plurality of local indicators of performance from the subset of the local systems, ii) calculating a global indicator of performance, using a global evaluation model, iii) comprising the global indicator of performance with the plurality of local indicators of performance, and determining a global setting parameter from said comparison, and sending to each local system information derived from said global setting parameter, to utilize in calculating a value of the local indicator of performance at step c3).

2. The method of claim 1, wherein step c) further comprises:

c5) selectively repeating steps c2) through c4) for another local set of parameters.

3. The method of claim 2, wherein step c) further comprises:

selectively repeating steps c2) to c4) for several sets of local parameters, for each local set of parameters, i) determining one or more statistical quantities related to a probability distribution of a future value of said local indicator of performance, from said collection of values thereof, as a function of said local set of parameters, ii) calculating the value of an optimization criterion, defined as a function of said one or more statistical quantities, the function being associated with the local set of parameters, and iii) selecting an optimal local set of parameters that optimizes the optimization criterion.

4. The method of claim 3, wherein step c) further comprises:

iv) setting the local set of parameters to match said optimal local set of parameters.

5. The method of claim 3, wherein, in step c3), a component of the local indicator of performance for a local parameter is proportional to that local parameter.

6. The method of claim 1, wherein:

step a) comprises generating said collection of global set of values for a plurality of horizons of time, step b) comprises transmitting said collection of global set of values for said plurality of horizons of time, and step c) is performed for at least a subset of said plurality of horizons of time.

7. The method of claim 6, wherein said collection of global sets of values comprises a first level sub-file for each horizon of time, each first level sub-file in turn including a plurality of second level sub-files.

8. The method of claim 6, wherein each horizon of time is associated with a time horizon indicator, the method further comprising creating a separate file or folder of files containing the corresponding subset of said global set of values for each horizon of time.

9. The method of claim 1, wherein step a) comprises:

a1) at an expert site, remote from at least some of said local systems, building a statistical joint behavior model of a subset of values in said global set thereof, said statistical joint behavior model being described by its joint distribution density, and a2) using said statistical joint behavior model to generate, at the central location, said collection of global set of values.

10. The method of claim 1, wherein step a) comprises generating said collection of global set of values to represent the possible future states in terms of magnitude of the quantifiable entities.

11. The method of claim 1, wherein:

step a) comprises generating said collection of global sets of values to represent the possible future states in terms of variations of the quantifiable entities from a given condition thereof, and c1) comprises receiving said collection of global sets of values, and recalculating the collection of global sets of the quantifiable entities in terms of magnitude.

12. The method of claim 1, wherein:
step a) comprises generating said collection of global sets of values in the form of multi-valued samples representing possible future states of said global environment, and
the multi-valued samples comprise s*m*p possible numerical values for representing the possible future states, where p is the number of quantifiable entities in a set, s is the number of sets in the collection, and m is the number of horizons of time.

13. The method of claim 1, wherein:
step a) comprises generating said collection of global sets of values in the form of multi-valued samples representing possible future states of said global environment, and
the multi-valued samples comprise s*m*p possible numerical values for representing the change between possible future states and a reference state, for instance an observed current state, where p is the number of quantifiable entities in a set, s is the number of sets in the collection, and m is the number of horizons of time.

14. The method of claim 1, wherein step b) comprises transmitting current state values together with said collection of global sets of numerical values.

15. The method of claim 1, wherein
step c) further comprises determining a statistical indicator related to a probability distribution of a future value of said local indicator of performance, from said collection of values thereof.

16. The method of claim 15, wherein the statistical indicator is at least one of the following:
Value-at-Risk; and
Standard deviation.

17. The method of claim 1, wherein step a) further comprises:
a3) maintaining, at the central location, a performance evaluation function for each of a plurality of possible local parameters of action,
wherein step b) further comprises:
b1) transmitting such performance evaluation functions, each in association with a respective parameter identifier, and
wherein step c3) comprises calculating said first value of the local indicator of performance by components, with a component of the local indicator of performance being calculated through applying a transmitted performance evaluation function to the corresponding local parameter, as defined by the parameter identifier.

18. The method of claim 1, wherein step a) comprises deriving observed values from sensors of the environment, and deriving a current set of values from said observed values through a selected model, and
step b) comprises transmitting the current set of values as part of said collection of global sets of values.

19. The method of claim 18, wherein said selected model uses an historic storage of said observed values.

20. The method of claim 19, wherein:
step a) comprises generating in a centralized way said collection of global sets of values, using a Monte-Carlo method and a generator of pseudo random numbers.

21. The method of claim 19, wherein:
step a) comprises generating, at the central location, said collection of global sets of values, using an historical method based on a plurality of past sets of values, and a probability indicator for each such past sets of values.

22. The method of claim 19, wherein step a) comprises:
introducing statistical joint behavior biases in said collection of global sets of values.

23. The method of claim 22, wherein step a) comprises:
introducing said statistical joint behavior biases in said collection of global sets of values upon request of a local system.

24. The method of claim 22, wherein step a) comprises:
locally generating said statistical joint behavior biases in a local system.

25. The method of claim 1, wherein steps a) and b) are performed substantially periodically.

26. The method of claim 1, wherein said transmission at step b) is a broadcast transmission.

27. The method of claim 1, wherein said transmission at step b) comprises peer-to-peer downstream transmissions that are sent to a plurality of local systems.

28. The method of claim 1, wherein said transmission at step b) comprises peer-to-peer upstream transmissions that are obtained from a plurality of local systems.

29. The method of claim 1, wherein said transmission at step b) is a broadcast transmission, and step c) comprises using a locally pre-selected portion of the collection of global sets of values, as received.

30. The method of claim 1, wherein said transmission at step b) comprises a plurality of point-to-point transmissions, each comprising a respective pre-selected portion of said collection of global sets of values.

31. The method of claim 1, wherein said transmission at step b) comprises offering a peer to peer access to a local system, each peer to peer access comprising a respective pre-selected portion of said collection of global sets of values.

32. The method of claim 1, further comprising applying, by one or more local systems, an algorithm to find an optimal set of local parameters with respect to a criterion that is either common or specific to each local system and which can be computed from the said collection of values of the local indicator of performance.

33. The method of claim 32, wherein:
step iii) comprises determining a plurality of global setting parameter values, as a function of a plurality of local set of parameters, and
the sending step comprises sending to each local system reference data for determining said local set of parameters, said reference data being derived from optimizing the function of step iii).

34. The method of claim 1, wherein the local systems include financial operators.

35. The method of claim 1, wherein the global environment includes global financial markets.

36. The method of claim 1, wherein the quantifiable entities include prices at which financial securities are traded.

37. The method of claim 1, wherein the local parameters include quantities of traded securities in a portfolio.

38. The method of claim 1, wherein the local indicator of performance includes a valuation of a portfolio of at least one of the financial operators.

39. The method of claim 1, wherein the global set of values includes a set of market variables from which the price of all traded securities can be recreated with a predetermined level of precision, using a local assessment model.

40. The method of claim 1, wherein step a) comprises introducing biased data within the collection of global sets of values, said biased data corresponding to a catastrophic scenario.

41. The method of claim 1, wherein step a) comprises introducing biased data within the collection of global sets of values as received, said biased data corresponding to a catastrophic scenario specified by a request from a local system.

42. The method of claim 1, wherein step c1) comprises introducing biased data within the collection of global sets of values as received, said biased data corresponding to a catastrophic scenario.

43. A system for simulating a local system which is in interaction with other local systems within a global environment, wherein said global environment has a global state that is represented by a global set of quantifiable entities, the interaction of a local system with said global environment is represented at a given time by a local set of parameters, and each local system has a predetermined local function to calculate a local indicator of performance, said predetermined local function using values of said global set of quantifiable entities and said local set of parameters, said system comprising:
generating means, provided at a central location separate from the local systems, for generating a collection of global sets of values, each of said global sets of values representing a possible future global state of said global environment at a future time, and said collection representing a variety of possible future global states,
transmitting means for transmitting the collection of global sets of values to the local systems,
at one or more of the local systems:
first receiving means for receiving at least some of said collection of global sets of values,
selecting means for selecting a first local set of parameters,
first calculating means for calculating a first value of the local indicator of performance, with said predetermined local function using a first global set of values in said collection thereof as received, and using said selected first local set of parameters, and
repeating means for selectively causing the first calculating means to be repeated while changing the global set of values within said collection thereof as received, until covering at least a portion of said collection, thereby obtaining a collection of values of the local indicator of performance,
using means for using said collection of values of the local indicator of performance as a predictive simulation of the local system, for said selected first local set of parameters thereof, and
controlling means for controlling, based on the predictive simulation performed for each of the local systems, one or more of the local systems to operate within predetermined constraints,
wherein the repeating means causes the selecting means and the first calculating means to be selectively repeated for different sets of local parameters,
wherein the using means comprises:
at one or more of the local systems, means for retransmitting the local indicator of performance back to a remote location that is common to a subset of local systems,
at said location:
second receiving means for receiving a plurality of local indicators of performance from said subset of the local systems,
second calculating means for calculating a global indicator of performance, using a global evaluation model,
comparing means for comparing the global indicator of performance with the plurality of local indicators of performance, and determining a global setting parameter from the comparison, and
sending means for sending to each local system information derived from the global setting parameter, to utilize in calculating a value of the local indicator of performance by the first calculating means.

* * * * *